United States Patent
Afzal

(10) Patent No.: US 12,368,727 B2
(45) Date of Patent: Jul. 22, 2025

(54) SYSTEMS AND METHODS FOR IMPROVED DETECTION OF NETWORK ATTACKS

(71) Applicant: MASTERCARD INTERNATIONAL INCORPORATED, Purchase, NY (US)

(72) Inventor: Sayed Amin Afzal, St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 455 days.

(21) Appl. No.: 17/976,391

(22) Filed: Oct. 28, 2022

(65) Prior Publication Data
US 2023/0137734 A1 May 4, 2023

Related U.S. Application Data

(60) Provisional application No. 63/273,672, filed on Oct. 29, 2021.

(51) Int. Cl.
*H04L 9/40* (2022.01)
*G06Q 20/40* (2012.01)

(52) U.S. Cl.
CPC ....... *H04L 63/1416* (2013.01); *G06Q 20/407* (2013.01); *H04L 63/1425* (2013.01)

(58) Field of Classification Search
USPC .......................................... 726/22
See application file for complete search history.

(56) References Cited

U.S. PATENT DOCUMENTS

| 9,129,108 | B2 | 9/2015 | Drissi et al. |
| 9,552,470 | B2 | 1/2017 | Turgeman et al. |
| 10,432,660 | B2 | 10/2019 | Crabtree et al. |
| 10,846,689 | B2 | 11/2020 | Matthews et al. |
| 11,206,280 | B2 | 12/2021 | Dada |
| 2009/0055828 | A1 | 2/2009 | McLaren et al. |

(Continued)

OTHER PUBLICATIONS

PCT International Search Report and Written Opinion, Application No. PCT/US2022/048160, dated Feb. 24, 2023, 9 pages.

(Continued)

*Primary Examiner* — Sanchit K Sarker
(74) *Attorney, Agent, or Firm* — Armstrong Teasdale LLP

(57) ABSTRACT

A computing system for detecting cyber-attack events is described. The computing system executes a roughness profiling engine and a cyber-attack detection model. The roughness profiling engine is configured to receive a plurality of payment transaction authorization request messages and generate a plurality of groups, each group of the plurality of groups associated with a first data field. The roughness profiling engine is also configured to profile the plurality of groups into a plurality of sub-groups, each sub-group of the plurality of sub-groups associated with a second data field and calculate a respective cumulative metric from the payment transaction authorization request messages associated with one of the plurality of sub-groups. The roughness profiling engine is further configured to determine a roughness ratio value, generate a set of feature inputs based on the roughness ratio value, and transmit the set of feature inputs to the cyber-attack detection model.

16 Claims, 11 Drawing Sheets
(3 of 11 Drawing Sheet(s) Filed in Color)

(56) References Cited

U.S. PATENT DOCUMENTS

| | | | |
|---|---|---|---|
| 2017/0293906 A1* | 10/2017 | Komarov | G06F 21/554 |
| 2019/0207960 A1* | 7/2019 | Chu | G06F 18/22 |
| 2020/0211019 A1* | 7/2020 | Allbright | G06N 20/10 |
| 2020/0211020 A1 | 7/2020 | Allbright et al. | |
| 2020/0211021 A1 | 7/2020 | Allbright et al. | |
| 2020/0349569 A1* | 11/2020 | Murao | G06Q 20/407 |
| 2020/0356663 A1 | 11/2020 | Paturi et al. | |
| 2020/0366700 A1* | 11/2020 | Prokop | H04L 63/1425 |

OTHER PUBLICATIONS

Paridhi Athe et al., "Investigation of Similarity Metrics for Simulation Based Scaling Analysis", ATH 2016, New Orleans, LA, Jun. 12-16, 2016, pp. 409-425.

* cited by examiner

SYSTEMS AND METHODS FOR IMPROVED DETECTION OF NETWORK ATTACKS

CROSS REFERENCE TO RELATED APPLICATION

This application claims the benefit of priority to U.S. Provisional Patent Application No. 63/273,672, filed Oct. 29, 2021, which is incorporated herein by reference in its entirety.

BACKGROUND

This disclosure relates generally to network-based cyber security and, more particularly, to computer systems and computer-based methods for early detection of a cyber-attack on a computer network.

Computer systems are used throughout our everyday lives. Multiple computers are networked together so information can be shared or communicated from one computer to another. Data shared over these computer networks is vulnerable to attacks by outside parties looking to misappropriate this data. For these reasons, computer networks need to be protected from such cyber-attacks including wide-range cyber-attacks.

For example, in the payment processing industry, payment processing networks process numerous payment transactions every day that are initiated by cardholders of payment cards. Most of these payment transactions are valid transactions. However, at least some of these payment transactions are fraudulent and may be part of a cyber-attack. Payment transaction processors, such as payment networks and/or issuing banks/processors and/or acquiring banks/processors, may monitor payment transactions for signs of fraudulent activity. At least some known cyber-attack detection systems monitor payment transactions one payment transaction at a time to determine whether the payment transaction is potentially fraudulent. At least some known computer models used to monitor and detect fraud are static models. Specifically, the models, once set, analyze the payment transactions in the same way over time. These known static models may not be able to detect low-level cyber-attacks or changing tactics of the fraudulent activity.

BRIEF DESCRIPTION

In one aspect, a computing system for detecting cyber-attack events in a computer network is described. The computing system includes at least one memory with instructions stored thereon and at least one processor in communication with the at least one memory wherein the instructions, when executed by the at least one processor, cause the at least one processor to execute a roughness profiling engine and a cyber-attack detection model. The roughness profiling engine is configured to receive a plurality of payment transaction authorization requests originating from a plurality of merchants and generate at least one data structure wherein the at least one data structure sorts the payment transaction authorization requests over a plurality of groups, each group of the plurality of groups associated with a first data field of the plurality of payment transaction authorization requests. The roughness profiling engine is also configured to profile the plurality of groups into a plurality of sub-groups, each sub-group of the plurality of sub-groups including payment transaction authorization requests of a respective group and associated with a second data field of the plurality of payment transaction authorization requests and calculate, over at least one time period, at least one respective cumulative metric from the payment transaction authorization requests associated with at least one of the plurality of sub-groups. The roughness profiling engine is further configured to determine at least one roughness ratio value including a ratio of a first value of the at least one respective cumulative metric for a first sub-group of the plurality of sub-groups with a first decay rate with respect to a second value of the at least one respective cumulative metric for the first sub-group of the plurality of sub-groups with a second decay rate, generate a set of feature inputs based on the at least one roughness ratio value, and transmit the set of feature inputs to the cyber-attack detection model wherein the cyber-attack detection model, in response to receipt of the set of features inputs, is configured to apply a machine learning model to the payment transaction authorization requests.

In another aspect, at least one non-transitory computer-readable storage medium with instructions stored thereon is described. The instructions, in response to execution by at least one processor implementing a roughness profiling engine and a cyber-attack detection model, cause the at least one processor to receive a plurality of payment transaction authorization requests originating from a plurality of merchants, generate at least one data structure wherein the at least one data structure sorts the payment transaction authorization requests over a plurality of groups, each group of the plurality of groups associated with a first data field of the plurality of payment transaction authorization requests, and profile the plurality of groups into a plurality of sub-groups, each sub-group of the plurality of sub-groups including payment transaction authorization requests of a respective group and associated with a second data field of the plurality of payment transaction authorization requests. The instructions also cause the at least one processor to calculate, over at least one time period, at least one respective cumulative metric from the payment transaction authorization requests associated with at least one of the plurality of sub-groups and determine at least one roughness ratio value including a ratio of a first value of the at least one respective cumulative metric for a first sub-group of the plurality of sub-groups with a first decay rate with respect to a second value of the at least one respective cumulative metric for the first sub-group of the plurality of sub-groups with a second decay rate. The instructions further cause the at least one processor to generate a set of feature inputs based on the at least one roughness ratio value and transmit the set of feature inputs to the cyber-attack detection model wherein the cyber-attack detection model, in response to receipt of the set of features inputs, is configured to apply a machine learning model to the payment transaction authorization requests.

In yet another aspect, a method for detecting cyber-attack events in a payment network implemented by at least one memory and at least one processor executing a roughness profiling engine and a cyber-attack detection model is described. The method includes receiving a plurality of payment transaction authorization requests originating from a plurality of merchants, generating at least one data structure wherein the at least one data structure sorts the payment transaction authorization requests over a plurality of groups, each group of the plurality of groups associated with a first data field of the plurality of payment transaction authorization requests, and profiling the plurality of groups into a plurality of sub-groups, each sub-group of the plurality of sub-groups including payment transaction authorization requests of a respective group and associated with a second data field of the plurality of payment transaction authorization requests. The method also includes calculating, over at least one time period, at least one respective cumulative metric from the payment transaction authorization requests associated with at least one of the plurality of sub-groups and determining at least one roughness ratio value including a ratio of a first value of the at least one respective cumulative metric for a first sub-group of the plurality of sub-groups with a first decay rate with respect to a second value of the at least one respective cumulative metric for the first sub-group of the plurality of sub-groups with a second decay rate. The method further includes generating a set of feature inputs based on the at least one roughness ratio value and transmitting the set of feature inputs to the cyber-attack detection model wherein the cyber-attack detection model, in response to receipt of the set of features inputs, is configured to apply a machine learning model to the payment transaction authorization requests.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A-8 show example embodiments of the systems and methods described herein.

FIG. 1A is a simplified block diagram of an example cyber-attack detection computing system for detecting fraudulent network attacks in a payment network in accordance with one example embodiment of the present disclosure.

FIG. 3 is a schematic diagram illustrating the cyber-attack detection computer system of FIG. 1A in communication with a multi-party payment processing network.

FIG. 4 is a simplified block diagram of the cyber-attack detection computing system shown in FIG. 1A in communication with the payment processing network shown in FIG. 3 in accordance with one embodiment of the present disclosure.

FIG. 5 illustrates an example configuration of a client system shown in FIG. 4.

FIG. 6 illustrates an example configuration of a server system shown in FIG. 4.

FIG. 7 shows an example configuration of the cyber-attack detection computing system shown in FIG. 1A.

FIG. 8 is a flow diagram of a computer-implemented method for detecting cyber-attacks in a payment transaction network.

DETAILED DESCRIPTION

Figure 2A:
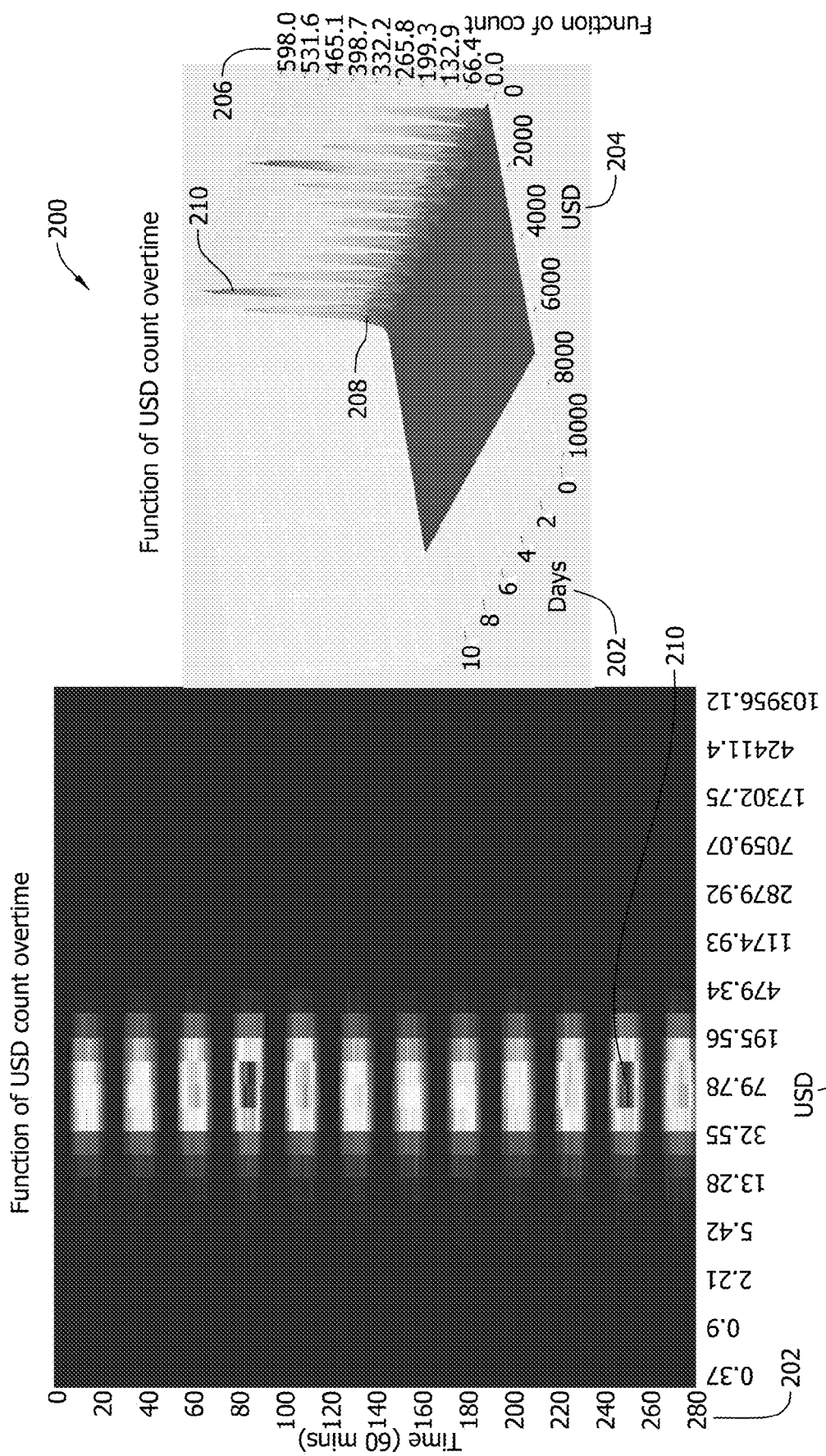
FIGS. 2A-2C illustrate example graphical user interfaces generated by the computing system shown in FIG. 1A.
Figure 2B:
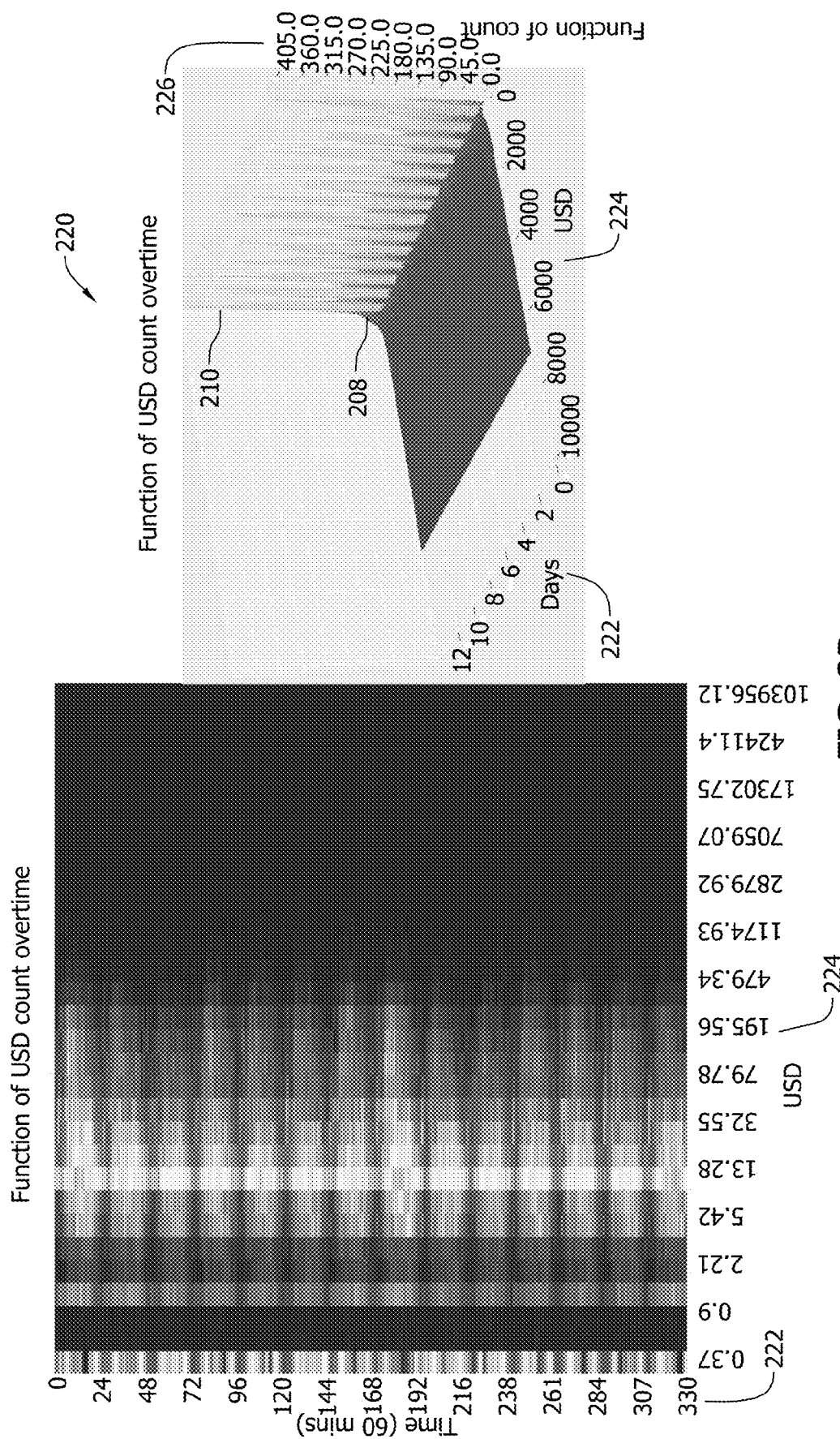
Figure 2C:
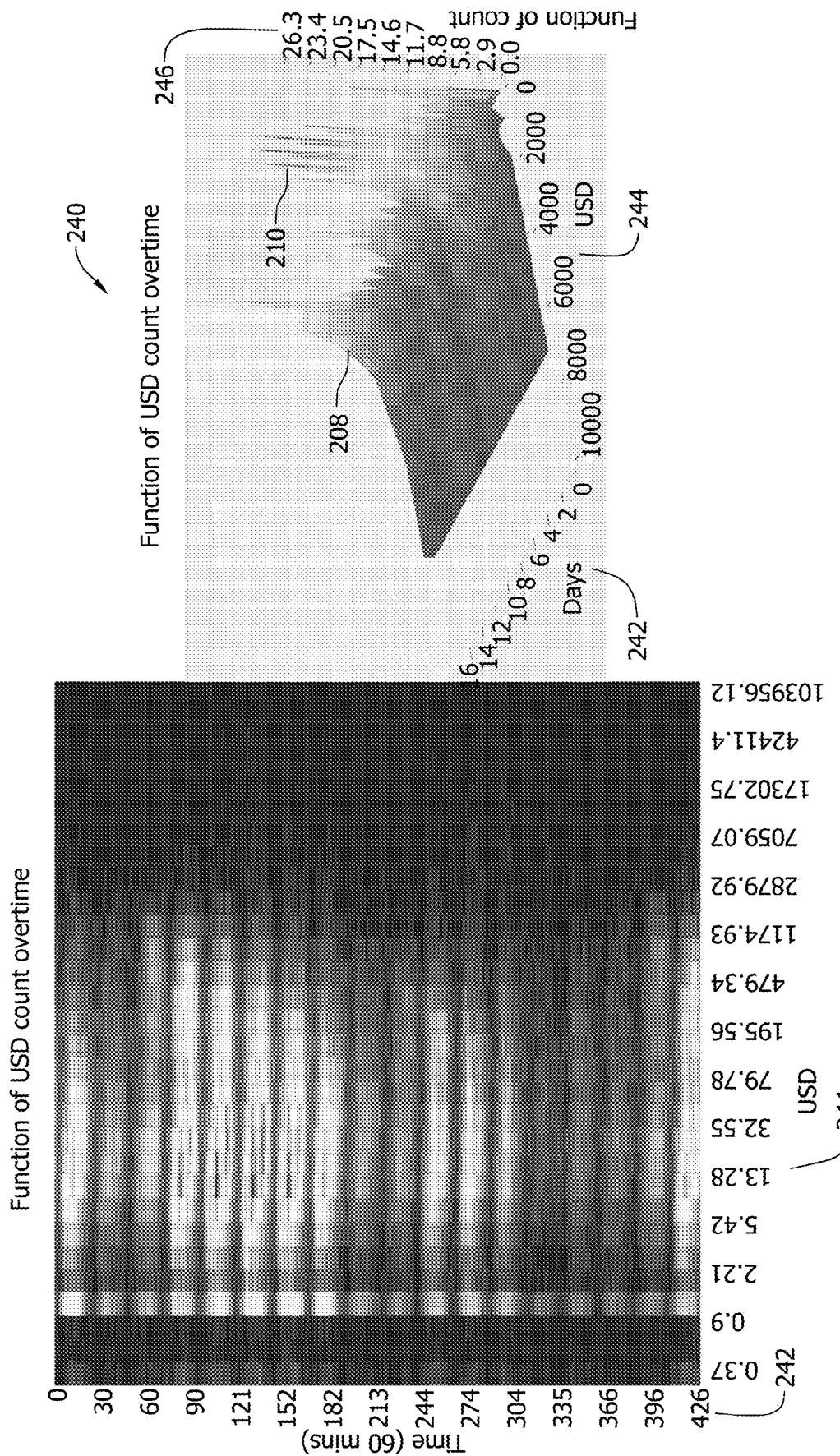

Embodiments of the present disclosure include a cyber-attack detection computer system and method. Initially, a roughness profiling engine processes and profiles authorization request messages into predefined data structures (e.g., groups and/or subgroups) associated with merchants or some other party involved in the payment process. The profiling engine produces additional data about groups of transaction authorization request messages (e.g., roughness data based upon certain ratio calculations, as shown in FIGS. 2A-2C). This additional data is generated and provided as an input (e.g., along with certain data from the authorization request messages) to at least one downstream cyber-attack detection model. The downstream cyber-attack detection model includes machine learning algorithms that may be selectable while the cyber-attack detection computer device is operating. By utilizing the inputs generated by the roughness profiling engine, the cyber-attack detection model is configured to more efficiently and more accurately detect cyber-attacks Today, transactions have a number of characteristics within a distribution over a period of time (e.g., a number/tally of transactions in a range of dollar amounts, etc.). However, these distributions/tallies can change drastically during a cyber-attack event. For example, the number of transactions performed at a particular merchant within a certain dollar amount range (e.g., $5-$10) may have a sudden increase during a cyber-attack as compared to that same range during normal operation. Accordingly, the systems and methods provided herein generate roughness data regarding various distributions over different periods of time to more efficiently detect cyber-attack events. Further, the systems and methods provided herein may be utilized to detect large-scale and/or small-scale cyber-attacks (e.g., at the individual transaction level).

In the example embodiment, a cyber-attack detection computing system utilizes incoming authorization messages (e.g., a plurality of data fields corresponding to transactions that has been requested to be authorized) to detect cyber-attacks. Notably, in some embodiments, the cyber-attack detection computing system does not require an authentication message (e.g., a plurality of data fields corresponding to a user to be authenticated before a transaction is completed) to detect a cyber-attack. Rather, the cyber-attack detection computing system utilizes authorization messages to both authorize transactions and authenticate users (e.g., cardholders). In other words, the system described herein is configured to identify or detect cyber-attacks using only the limited amount of data provided in authorization messages.

In some embodiments, these messages may be in ISO 8583 or ISO 20022 message formats for processing over a dedicated payment processing network. As used herein, "ISO" refers to a series of standards approved by the International Organization for Standardization (ISO is a registered trademark of the International Organization for Standardization of Geneva, Switzerland). ISO 8583 compliant messages are defined by the ISO 8583 standard which governs financial transaction card originated messages and further defines acceptable message types, data elements, and code values associated with such financial transaction card originated messages. ISO 8583 compliant messages include a plurality of specified locations for data elements. ISO 20022 compliant messages are defined by the ISO 20022 standard. For example, ISO 20022 compliant messages may include acceptor to issuer card messages (ATICA).

For example, if the roughness (deviation of more recent activity from a historic (e.g., long-term) pattern) is for U.S. Dollars (USD) and the roughness is measured for the spend of a card (e.g., the card being the "group"), then the system may utilize USD amount, a card identifier (PAN or ID number), and the timestamp of transactions (e.g., the USD amount, card identifier (PAN or ID number), and timestamp of transactions being potential "sub-groups") from at least one authorization message in order to profile/group the transactions. In the example embodiment, the cyber-attack detection computing system groups/profiles incoming transactions into groups defined by different USD ranges.

Notably, in the example described above, the card number may be replaced and/or supplemented with a merchant ID, an issuer ID, an acquirer ID, an account range, or any grouping key. Further, USD groups (e.g., that the transactions are sorted into) may be replaced by any quantitative value, such as fraud score of transactions (e.g., as calculated by an upstream model). USD ranges may also be replaced by categories, such as point of sale (POS), card not present (CNP), automated teller machine (ATM), distribution of a grouping key (e.g., card) etc.). In other words, additionally/alternatively, the cyber-attack detection computing system may profile/group transactions into groups associated with categories (e.g., POS/CNP/ATM) instead of and/or in addition to profiling/grouping transactions into groups defining certain numerical ranges (e.g., USD ranges and/or fraud score ranges). USD can also be replaced with some other form of currency.

In some embodiments, fields from authorization messages and how they are used by the cyber-attack detection computing system may be as follows: 1) A base metric (e.g., a metric defining distribution characteristics, such as USD): to break the metric into some bins/groups and once a transaction is observed, increment the counter of the bin that the value of the base metric falls within; 2) Grouping key (e.g., card number): to determine a unique distribution (roughness) for each individual key; and 3) Timestamp: to decay the counter value of the metric bins based on the elapsed time.

In the example embodiment, the cyber-attack detection computing system is configured to analyze, by a roughness profiling engine, authorization messages in real-time and at least one of, in response to an output from a cyber-attack detection model, i) transmit an alert to a merchant regarding a cyber-attack; ii) recommend a merchant deny a transaction; and/or iii) deny a transaction or in some cases, cause additional computation resources to be deployed to address the possibility of subsequent transactions being fraudulent due to the cyber-attack (e.g., automatic deployment of additional computer resources to authenticate future transaction requests associated with a group (e.g., merchant, issuer, acquirer, cardholder, etc.) to further reduce a likelihood of transactions associated with a cyber-attack being authenticated).

As an example of additional computer resources being deployed, when a potential cyber-attack is detected and a subsequent and/or current transaction is in the process of occurring, the cyber-attack detection computing system may flag the transaction for future analysis and/or cause a user interface including a notification of the potential cyber-attack to be presented on a computing device (e.g., to prompt entry of a one-time password texted to a telephone number, answer a challenge question, or perform a biometric scan). The user interface also presents an option to select or confirm receipt of the notification and/or whether the transaction should continue (e.g., be finalized). Further, potential cyber-attacks may be determined based on risk-based authentication (RBA) and/or risk-based decisioning (RBD). For example, if data and/or metadata associated with a transaction does not match that of a potential cyber-attack (e.g., based on roughness), the cyber-attack detection computing system may determine that those transactions are likely not a result of a cyber-attack, (e.g., and that the transaction is legitimate). The transaction may then be performed with no further computer resources being deployed (e.g., no further authentication steps, such as challenge questions, verification codes, etc.). However, if data and/or metadata does match that of a potential cyber-attack (e.g., as described herein), then the cyber-attack detection computing system may cause a message to be sent to the merchant and/or issuer (e.g., as examples) to deny the transaction or to present the option to deny the transaction.

In order to determine whether a cyber-attack is occurring, the cyber-attack detection computing system may perform a number of operations. For example, based upon an incoming authorization message and data included therein (e.g., a primary account number (PAN), merchant identifier, account range, country etc.), the roughness profiling engine is configured to update/partition/increment velocities (e.g., exponential-decaying velocities). Example partitions/groups and/or sub-groups may include issuers, merchants, and PANs. Example velocities may include total USD, USD distribution bins/groups, cross-border, channel (ATM/CNP/POS), product type (debit/prepaid/credit), merchant class, PAN entry mode, refund, consumer/corporate, zero dollar flags, decision intelligence (DI), high-risk countries, high-risk MCC groups (e.g., money-send, gambling, etc.), safe MCCs (e.g., hospitals, schools, etc.), and/or commercial. As used herein, velocity generally relates to a number of qualifying transactions initiated by one or more consumers using one or more payment devices over a selected period of time, where the transactions qualify if they meet one or more qualifying criteria for a group/sub-group of a data structure (e.g.; data structure 106).

Further, some velocities may be sub-partitioned (e.g., by transaction channel (point of sale (POS), card not present (CNP), automated teller machine (ATM), etc.)). For example, if a velocity corresponds to ATM traffic of a merchant, once a transaction is received by the cyber-attack detection computing system, the cyber-attack detection computing system checks the merchant of the transaction and looks it up in a stored velocity memory grid (e.g., generated by the cyber-attack detection computing system, see FIGS. 2A-C). If the transaction is ATM, the cyber-attack detection computing system decays the past value of the velocity and adds one to it.

In some embodiments, sub-partitions (e.g., sub-traffics) include cross-border, channel, product type (credit/debit/prepaid), USD bins, and/or other groupings. In some embodiments, velocities may be incremented by quantitative values, such as USD of the transaction (e.g., or a fraud score). Velocities may be built at different decaying rates (e.g., 10-minute, 6-hour, and 56-day).

In the example embodiment, certain velocities are used as inputs for a machine learning model. In some embodiments, certain data fields from the received authorization messages are used as inputs to the machine learning model (e.g., USD amount, cross-border, fraud score, etc.).

Further, some inputs to the machine learning model (e.g., composite features) are built based on the velocities generated by the cyber-attack detection computing system. An example of such an input is traffic rate. Traffic rate is the division of two velocities with the same partition key (e.g., group) and sub-traffic (e.g., sub-group) but different decay rates. The numerator has a shorter decay rate than the denominator. Also, the numerator and denominator have constants. This composite feature tells the model how much a sub-traffic within a partition key is increased compared to a long-term pattern of the sub-traffic.

Certain inputs to the machine learning model that are determined by the cyber-attack detection computing system are based upon "distribution roughness" and "relative distribution roughness." As described herein, distribution roughness is used to describe deviation of more recent activity from a historic (e.g., long-term) pattern (e.g., at a merchant). Further, relative distribution roughness is used to describe the ratio of, as an example, a more short-term roughness (e.g., one hour) to a more long-term roughness (e.g., two month). If these deviations are large, the surface is rough (e.g., indicating a likelihood of cyber-attack); if they are small, the surface is smooth (e.g., see FIGS. 2A-C as examples of "heat maps" where large deviations resulting in roughness (e.g., peaks) are illustrated in red while small deviations resulting in smoothness are illustrated in blue). Other ratios of roughnesses are also envisioned.

As an example, suppose the cyber-attack detection computing system is determining how coarse (e.g., rough) the long-term USD distribution of a merchant is. To represent the long-term USD distribution, first, the cyber-attack detection computing system profiles/splits the USD spectrum inputs into certain groups/sub-groups (e.g., a first group corresponding to the merchant and sub-groups corresponding to ranges of USD amounts). Then, the cyber-attack detection computing system builds exponential-decayed velocities with a relatively long decay rate (e.g., 2 months) for each sub-group. In other words, each velocity represents the number of transactions that fall within the USD range associated with the respective group. Due to the decay rate, the count of more recent transactions may have higher weights than the older transactions as they fade.

Continuing this example, the cyber-attack detection computing system may then determine the difference of the velocities for each sub-group from its neighboring sub-group (e.g., a next-closest range of USD, a next-closest time frame, etc.), and square the difference. The cyber-attack detection computing system may then sum all of the squared differences, and calculate the square root of the sum of the squared differences (e.g., and in some embodiments divide the square root by velocity and/or constant). This value is the historic "roughness" of the distribution (e.g., distribution roughness ratio). Accordingly, the cyber-attack detection computing system has determined the USD distribution roughness with a two-month decay rate for that particular merchant.

Further, continuing the above example, roughnesses with different decay rates may be calculated by the cyber-attack detection computing system by using the same formula described above, but using a different decay rate (e.g., a shorter decay rate such as a one-hour decay rate). Then, the cyber-attack detection computing system may divide the shorter (e.g., one-hour) decay rate by the longer (e.g., two-month) decay rate to calculate the short-term to long-term relative distribution roughness (e.g., rate-based distribution roughness ratio). Examples of formulas for a distribution roughness ratio and rate-based distribution roughness ratio (e.g., along with a bar graph showing velocities of different bins shown in FIG. 1B), are shown below (e.g., wherein R is roughness, v is velocity, b is a bin number, t is time, and d (e.g., as shown in FIG. 1B) is a difference between bins):

Distribution roughness ratio $$R_{B,t_0} = \frac{\sqrt{\sum (v_{b,t_0} - v_{b+1,t_0})^2}}{v_{t_0}}$$

Rate-based distribution roughness ratio: $\frac{R_{B,t_0}}{R_{B,t_1}}$

In some embodiments, the relativity can be used across different traffics (e.g., groups/sub-groups) instead of different decay rates (e.g., as described in the example above). In some embodiments, traffics other than USD distribution (e.g., in the example above) may be used in the process described above (e.g., based upon fraud scores, merchant categories, country/region, etc.).

The inputs provided by the roughness profiling engine to the model described herein may include basic features (e.g., over 1,000 data fields) and/or composite features including composites of basic features and/or any other features. Notably, as described herein, roughness is a key metric provided to the model. Accordingly, the model operates upon receipt of inputs and executes based at least in part upon the received inputs/features for all incoming transactions. For example, hundreds of calculations may be performed for each transaction. The machine learning model learns relationships between metrics (e.g., inputs/features) and may weigh certain metrics more over time than others in order to more accurately detect cyber-attacks.

In some embodiments, the cyber-attack detection computing system generates new features (e.g., variables/inputs) that are used as inputs to a machine learning model. The new features improve the performance of models by causing the models to detect more fraud/cyber-attacks while making less mistakes than known systems (e.g., incorrectly flagging non-fraudulent transactions as fraud/attack). Notably, these features can be used in any machine learning process that incorporates velocities as input features. In some embodiments, the machine learning model may utilize data from a plurality of different sources to detect potential cyber-attacks (e.g., inputs from a calendar that may provide a reason for an increase in a number of transactions other than a potential cyber-attack, such as the occurrence of an event (e.g., a concert, sporting event, etc.), holiday, etc.) and prevent false-positive results.

Based upon a comparison with known systems over a period of a month, the cyber-attack detection computing system described herein flagged/detected 8.9 million transactions as fraudulent with only twelve thousand mistakes. A known system used over the same period of time only flagged 4.2 million transactions (number of mistakes unknown). Accordingly, based upon known performance of known systems, the new system described herein is expected to be five to ten times more efficient than known systems (e.g., by flagging twice as many transactions and making four times less mistakes).

Upon detecting a cyber-attack (e.g., one or more fraudulent transactions), the cyber-attack detection computing system is configured to, in some embodiments, at least one of: alert the issuer and/or merchant of potential fraud; transmit a message to a merchant and/or issuer device allowing the merchant and/or issuer to decide whether to decline a transaction (e.g., causing display of controls (e.g., accept, decline, etc.) at a GUI of merchant and/or user device); and/or automatically decline transactions associated with an output from the machine learning model greater than a threshold output or deploy additional computation resources for detecting and addressing the possibility of subsequent fraudulent transactions due to the cyber-attack (e.g., a threshold fraud score, for example based on roughness being above a threshold).

Further, in some embodiments, a notification system may be triggered by a combination of one or more threshold-based alerts (e.g., alerts indicating the presence of multiple real-time, non-correlated statistical anomalies). For example, the system may provide a visual, email, text message, or other notification to analysts when a change in fraudulent transaction velocity has increased over certain time periods.

In other words, a computing system for detecting cyber-attack events in a payment network is described. In the example embodiment, the computing system receives a plurality of payment transaction authorization requests originating from a plurality of merchants and generates at least one data structure wherein the at least one data structure sorts the payment transaction authorization requests over a plurality of groups, each group of the plurality of groups associated with a first data field of the plurality of payment transaction authorization requests (e.g., merchant identifier (ID), an issuer ID, or an acquirer ID). The computing system also profiles the plurality of groups into a plurality of sub-groups, each sub-group of the plurality of sub-groups including payment transaction authorization requests of a respective and associated with a second data field of the plurality of payment transaction authorization requests group (e.g., one or more dollar amounts).

Further, the computing system calculates, over at least one time period, at least one respective cumulative metric (e.g., velocity) from the payment transaction authorization requests associated with at least one of the plurality of sub-groups. The computing system also determines at least one roughness ratio value including a ratio of a first value of the at least one respective cumulative metric for a first sub-group of the plurality of sub-groups with a first decay rate with respect to a second value of the at least one respective cumulative metric for the first sub-group of the plurality of sub-groups with a second decay rate. Then, the computing system generates a set of feature inputs (e.g., including the at least one cumulative metric and the at least one roughness ratio value) based on the at least one roughness ratio value (e.g., see FIGS. 2A-2C) and transmits the set of feature inputs to the downstream cyber-attack detection model wherein the downstream cyber-attack detection model, in response to receipt of the set of features inputs, is configured to apply a machine learning model to the payment transaction authorization requests.

In some embodiments, the computing system receives a model output from the downstream cyber-attack detection model identifying a potential cyber-attack and transmits a notification regarding the potential cyber-attack to a computing device associated with the first data field (e.g., wherein the first data field comprises at least one of a merchant identifier (ID), an issuer ID, or an acquirer ID).

In some embodiments, the computing system identifies potential cyber-attacks in real-time or near-real-time. For example, the computing system may receive a new payment transaction authorization request and profile the new payment transaction authorization request into a group of the plurality of groups and a sub-group of the group. The computing system may then update the at least one respective cumulative metric associated with the sub-group and determine a new roughness ratio value based on the updated at least one respective cumulative metric. The computing system may also generate a new set of feature inputs based on the new roughness ratio value and transmit the new set of feature inputs to the downstream cyber-attack detection model.

Continuing the example above, the computing system may receive a model output from the downstream cyber-attack detection model identifying a potential cyber-attack and transmit a notification regarding the potential cyber-attack to a computing device associated with the first data field (e.g., wherein the first data field comprises at least one of a merchant identifier (ID), an issuer ID, or an acquirer ID). In some embodiments, the computing system may receive a model output from the downstream cyber-attack detection model identifying a potential cyber-attack and automatically deny the new payment transaction authorization request based on the model output.

The technical problems addressed by this system include at least one of: (i) undetected network-based cyber-attack events on a payment transaction network; (ii) increased network load based on some types of cyber-attack events; (iii) computational burdens imposed by automated cyber-attack monitoring systems; and (iv) too little contrast between fraudulent transactions and legitimate transactions in some time frames to make detection possible. Other technical problems addressed by the system and methods described herein may include increased network usage (slowing down the network) due to undetected cyber-attacks (e.g., systematic attacks to determine card verification numbers through trial and error).

The methods and systems described herein may be implemented using computer programming or engineering techniques including computer software, firmware, hardware, or any combination or subset thereof, wherein the technical effects may be achieved by performing at least one of the following steps: (i) receiving a plurality of payment transaction authorization requests originating from a plurality of merchants; (ii) generating at least one data structure wherein the at least one data structure sorts the payment transaction authorization requests over a plurality of groups, each group of the plurality of groups associated with a first data field of the plurality of payment transaction authorization requests; (iii) profiling the plurality of groups into a plurality of sub-groups, each sub-group of the plurality of sub-groups including payment transaction authorization requests of a respective group and associated with a second data field of the plurality of payment transaction authorization requests; (iv) calculating, over at least one time period, at least one respective cumulative metric from the payment transaction authorization requests associated with at least one of the plurality of sub-groups; (v) determining at least one roughness ratio value including a ratio of a first value of the at least one respective cumulative metric for a first sub-group of the plurality of sub-groups with a first decay rate with respect to a second value of the at least one respective cumulative metric for the first sub-group of the plurality of sub-groups with a second decay rate; (vi) generating a set of feature inputs based on the at least one roughness ratio value; and (vii) transmitting the set of feature inputs to the downstream cyber-attack detection model, wherein the downstream cyber-attack detection model, in response to receipt of the set of features inputs, is configured to apply a machine learning model to the payment transaction authorization requests.

The resulting technical effect achieved by this system is at least one of: (i) reducing network-based cyber-attack events through early detection; (ii) reducing network-based cyber-attack events through multiple cyber-attack detection methods; (iii) applying both individual transaction fraud profiling and a cumulative cyber-attack detection model to payment authorization requests prior to forwarding of the authorization requests to an issuer; (iv) enabling visual network data views to detect cyber-attack events; and (v) eliminating economic loss through, for example, early detection and reaction to fraudulent network events. Thus, the system enables enhanced cyber-attack detection on the payment transaction network. Once a pattern of fraudulent activity is detected and identified, further fraudulent payment transaction attempts may be reduced or isolated from further processing on the payment processing network, which results in a reduced amount of fraudulent network traffic and reduced processing time devoted to fraudulent transactions, and thus a reduced burden on the network.

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, a "processor" may include any programmable system including systems using central processing units, microprocessors, micro-controllers, reduced instruction set circuits (RISC), application specific integrated circuits (ASICs), logic circuits, and any other circuit or processor capable of executing the functions described herein. The above examples are example only and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

In one embodiment, a computer program is provided, and the program is embodied on a computer readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

The systems and processes are not limited to the specific embodiments described herein. In addition, components of each system and each process can be practiced independent and separate from other components and processes described herein. Each component and process can also be used in combination with other assembly packages and processes.

As used herein, the terms "payment card," "transaction card," and "financial transaction card" refer to any suitable payment card, such as a credit card, a debit card, a prepaid card, a charge card, a membership card, a promotional card, a frequent flyer card, an identification card, a prepaid card, a gift card, and/or any other payment device that may hold payment account information, such as mobile phones, smartphones, personal digital assistants (PDAs), key fobs, and/or computers. Each type of payment device can be used as a method of payment for performing a transaction.

As used herein, the term "fraud" is used in the context of payment transactions and refers, generally, to an unprivileged use of a payment card. For example, a thief may steal a consumer's payment or information from a payment card (e.g., a payment account number (PAN), expiration date, security code) and attempt to use the payment card for purchases. This type of transaction may be monitored by, for example, a cyber-attack detection system within a payment network. Further, as used herein, a "suspected fraudulent transaction" is a payment transaction that is suspected to be fraudulent, but which has not yet been confirmed as fraudulent by, for example, the consumer of the underlying payment card, or the issuing bank, or an analyst associated with the cyber-attack detection system.

As used herein, the term "real-time" is used, in some contexts, to refer to a regular updating of data within a system such as the cyber-attack detection systems, the cyber-attack management systems, and/or the displays described herein. When a system is described as processing or performing a particular operation "in real-time," this may mean within seconds or minutes of an occurrence of some trigger event, such as new data being generated, or on some regular schedule, such as every minute. In other contexts, some payment transactions require "real-time" cyber-attack operations, such as fraud scoring, which refers to operations performed during authorization of a payment transaction (e.g., between the moment that a new payment transaction is initiated from, for example, a merchant, and the time that an authorization decision is made, for example, back to that merchant). In such a context, "near real-time" fraud operations are operations conducted shortly after the payment transaction has occurred (e.g., after an authorization decision is made).

The following detailed description illustrates embodiments of the disclosure by way of example and not by way of limitation. It is contemplated that the disclosure has general application to cyber-attack management of payment transactions.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1A:
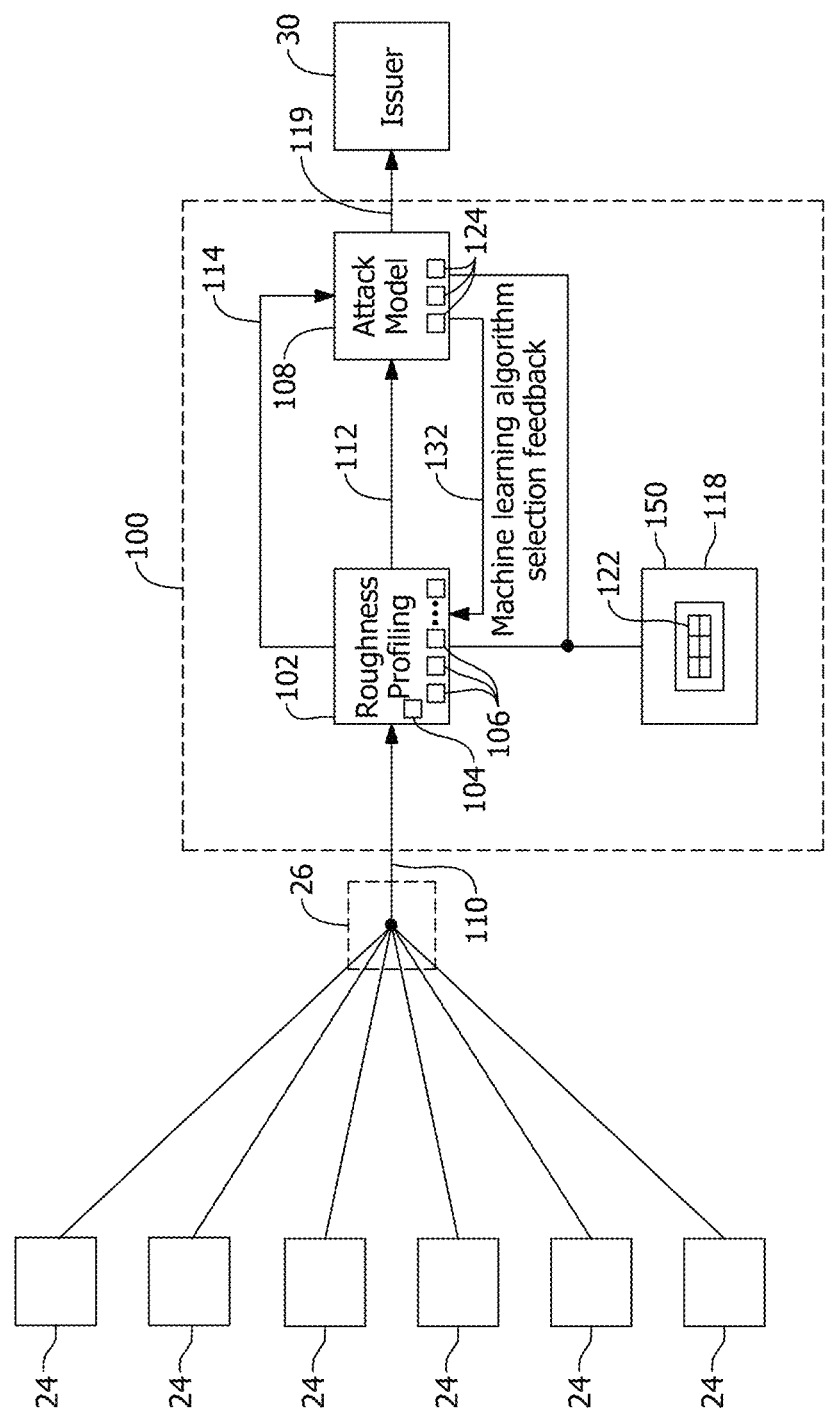
Figure 1B:
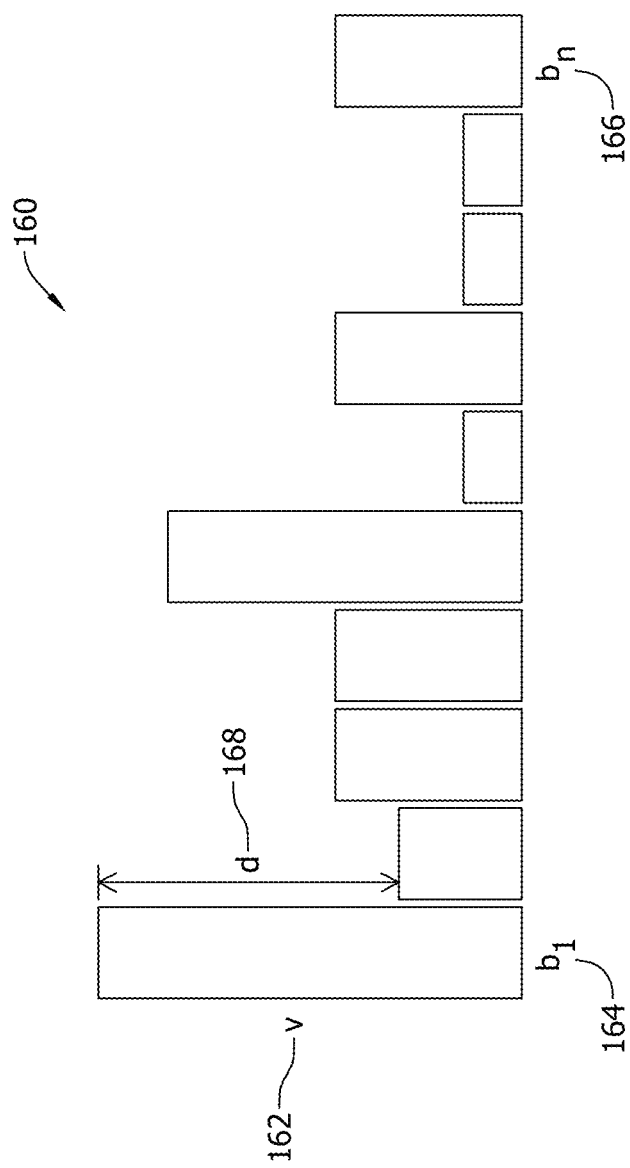
FIG. 1B is an example graph showing cumulative metrics across different groupings, as generated by the computing system shown in FIG. 1A.
Figure 3:
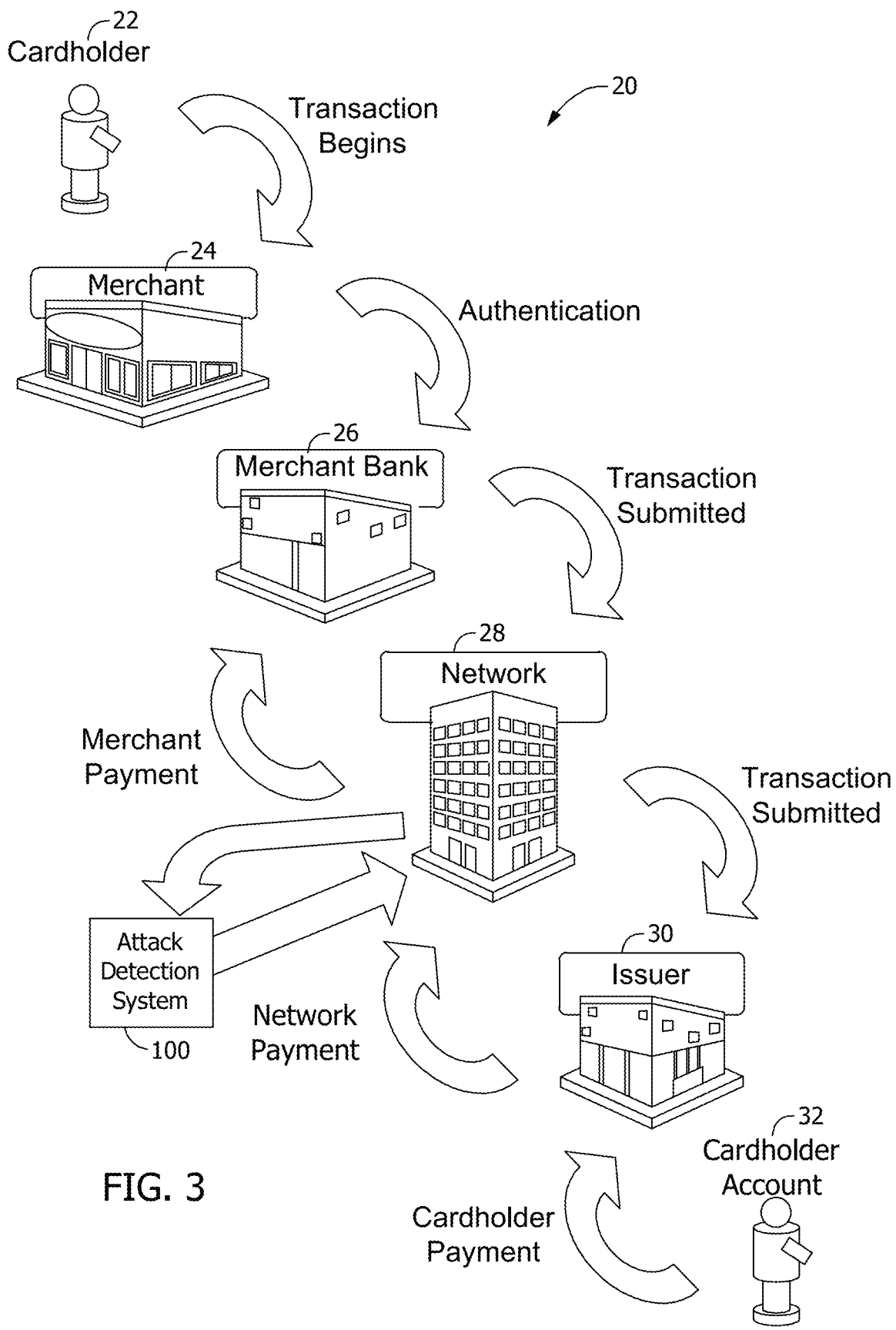

FIG. 1A is a schematic block diagram of a cyber-attack detection computing system 100 for detecting fraudulent network events in a payment processing network, such as payment processing network 28 (shown in FIG. 3). For example, fraudsters may introduce fraudulent transactions through a merchant 24 in an attempt to deceive an issuer 30 into authorizing a transaction with a payment card that is not owned and/or controlled by the person presenting the payment card at a time of purchase. Such transactions may be monitored for fraudulent activity.

Fraudulent transactions may strain the processing and network resources of payment processing network 28. For example, some types of attempted cyber-attacks include a large number of attempted online transactions in a short period of time, which may limit a bandwidth of payment processing network 28 that is available for legitimate transactions. As another example, fraudulent transactions that are not detected prior to authorization by issuer 30 may result in additional activity over payment processing network 28 such as voids, rollbacks of cleared and settled transactions, and so forth, which may reduce processing speed and bandwidth available for legitimate transactions.

In the example embodiment, cyber-attack detection computing system 100 includes a roughness profiling engine 102 communicatively coupled to a plurality of merchants 24 directly or through at least one merchant bank 26. A roughness profiling engine 102, including a processor 104, is configured to generate a plurality of data structures 106 and is communicatively coupled to cyber-attack detection model 108. Cyber-attack detection computing system 100 also includes cyber-attack detection model 108 communicatively coupled to roughness profiling engine 102. In some embodiments, two or more of roughness profiling engine 102 and cyber-attack detection model 108 are implemented on a common computing platform. In alternative embodiments, each of roughness profiling engine 102 and cyber-attack detection model 108 are implemented on separate computing platforms and coupled together in electronic communication.

Roughness profiling engine 102 is configured to receive a plurality of payment transaction authorization requests 110 (e.g., authorization request messages) from plurality of merchants 24 either directly or from at least one merchant bank 26. In various embodiments, payment transaction authorization requests 110 are received by payment processing network 28 (shown in FIG. 3) and forwarded to roughness profiling engine 102. In some embodiments, roughness profiling engine 102 is configured to analyze each of the received plurality of payment transaction authorization requests 110 on an individual basis (that is, without regard to characteristics of other incoming payment transaction authorization requests) for fraud. Roughness profiling engine 102 is configured to sort the payment transaction authorization requests 112 into at least one data structure 106 (e.g., wherein each data structure is based upon predefined characteristics such as USD amount).

In some embodiments, at least one of the data structures 106 is associated with a plurality of ranges from lower thresholds to upper thresholds. In some embodiments, at least two of the ranges overlap, such that a particular payment transaction authorization request may be stored in two locations in a data structure 106 and/or in two data structures 106. In some embodiments, roughness profiling engine 102 is configured to first sort the payment transaction authorization requests 110 into separate groups (e.g., by merchant, based upon a merchant ID in a request 110), and then build a respective data structure 106 for each group. For example, each group may be defined to include a subset of incoming payment transaction authorization requests 110 associated with a particular range of a lower US Dollar (USD) amount and an upper USD amount. In other words, a merchant 24 can have customers that make purchases corresponding to ranges of 0-$10, $10-$20, and $20-$35, etc. Certain ranges may be larger than others (e.g., 0-$10 is a smaller range than $20-$35). Each transaction that gets performed at a merchant is assigned by engine 102 into a range of structure 106 based on the USD amount. In some embodiments, the groups of a structure 106 may be a counter to determine how many transactions in each group have occurred. For example, there may be twenty-two purchases in the 0-$10 group, ten purchases in the $10-$20 group, etc.

In some embodiments, structures 106 may include groups/sub-groups and/or ranges other than USD. For example, structures may be associated with a corresponding issuer 30, a corresponding geographic region in which the transactions occurred (e.g., each group of a structure corresponds to a different geographic region), or another preselected grouping based on information contained in payment transaction authorization requests 110 (e.g., cross-border transactions, product type (e.g., credit, debit, prepaid, etc.), USD amount, MCC (merchant category code) grouping, channel (ATM/CNP/POS), PAN entry mode, authentication method, fraud/risk score from an upstream model, consumer/corporate, country grouping, and geographical grouping). In some embodiments, engine 102 is configured to determine roughnesses associated with at least USD amount and MCC grouping.

Roughness profiling engine 102 is further configured to parse each data structure 106 over a plurality of time periods and calculate, for each of the time periods, at least one cumulative metric (e.g., velocity) from the payment transaction authorization requests 110. In addition, roughness profiling engine 102 is configured to determine a ratio of a first value of the metric in a first USD range from a first time period with respect to a second value of the metric in the first USD range during a second time period (e.g., wherein the second time period extends back farther in time than the first time period).

In some embodiments, metrics may be built with decay rates. In some embodiments, metrics may be built with different decay rates (e.g., ten minutes, six hours, fifty-six days, etc.). In some embodiments, metrics may be built based on other metrics (e.g., traffic rate) and inserted to model 108. For example, traffic rate is the division of two metrics with the same partition key (e.g., merchant group) and sub-traffic (e.g., in the same USD range) but different decay rates. The nominator has a shorter decay rate than the denominator. Also, the nominator and denominator may have constants. This metric is used by engine 102 to communicate to model 108 how much a sub-traffic (e.g., sub-group) within a partition key (e.g., group) is increased compared to a longer-term pattern.

Certain inputs to model 108 that are determined by computing system 100 are based upon "distribution roughness" and "relative distribution roughness." As described herein, distribution roughness is used to describe deviation of more recent activity from a historic (e.g., long-term) pattern (e.g., at a merchant). Further, relative distribution roughness is used to describe the ratio of, as an example, a more short-term roughness (e.g., one hour) to a more long-term roughness (e.g., two month). If these deviations are large, the surface is rough; if they are small, the surface is smooth (e.g., see FIGS. 2A-C). Other ratios of roughnesses are also envisioned.

As an example, suppose the cyber-attack detection computing system is determining how coarse (e.g., rough) the long-term USD distribution of a merchant is. To represent the long-term USD distribution, first, computing system 100 profiles/splits the USD spectrum inputs into certain groups/sub-groups (e.g., ranges of USD amounts). Then, computing system 100 builds exponential-decayed velocities with a relatively long decay rate (e.g., two months) for each group. In other words, each velocity represents the number of transactions that fall within the USD range associated with the respective group. Due to the decay rate, the count of more recent transactions may have higher weights than the older transactions as they fade.

Continuing this example, the computing system 100 may then determine the difference of the velocities for each group from its neighboring group. For example, FIG. 1B is an example graph 160 showing cumulative metrics across different groupings, as generated by computing system 100. As shown in graph 160, v is velocity 162 (e.g., shown on the y-axis), b is a bin number (e.g., ranging from $b_1$ 164 to $b_n$ 166, and d is a difference 158 between bins. For instance, each bin ranging from $b_1$ 164 to $b_n$ 166 may be associated with a different USD range. Then, the difference of the velocities for each group/bin from its neighboring group/bin (e.g., a next-closest range of USD, a next-closest time frame, etc.) is calculated, and the difference is squared. Computing system 100 may then sum all of the squared differences, and calculate the square root of the sum of the squared differences (e.g., and in some embodiments divide the square root by velocity and/or constant). This value is the historic "roughness" of the distribution (e.g., distribution roughness ratio). Accordingly, computing system 100 has determined the USD distribution roughness with a two-month decay rate for that particular merchant.

Further, continuing the above example, roughnesses with different decay rates may be calculated by computing system 100 by using the same formula described above, but using a different decay rate (e.g., a shorter decay rate such as a one-hour decay rate). Then, computing system 100 may divide the shorter (e.g., one-hour) decay rate by the longer (e.g., two-month) decay rate to calculate the short-term to long-term relative distribution roughness (e.g., rate-based distribution roughness ratio). Examples of formulas for a distribution roughness ratio and rate-based distribution roughness ratio along with a bar graph showing velocities of different bins shown in FIG. 1B, are shown below (e.g., wherein R is roughness, v is velocity, b is a bin number, t is time, and d (e.g., as shown in FIG. 1B) is a difference between bins):

Distribution roughness ratio $$R_{B,t_0} = \frac{\sqrt{\sum (v_{b,t_0} - v_{b+1,t_0})^2}}{v_{t_0}}$$

Rate-based distribution roughness ratio: $\frac{R_{B,t_0}}{R_{B,t_1}}$

In some embodiments, the relativity can be used across different traffics (e.g., groups/sub-groups) instead of different decay rates (e.g., as described in the example above). In some embodiments, traffics other than USD distribution (e.g., in the example above) may be used in the process described above (e.g., based upon fraud scores, merchant categories, country/region, etc.).

In the example embodiment, data structure 106 is parsed to determine a tally of each payment transaction authorization request stored within each group of a structure 106 over each of a plurality of time periods. Roughness profiling engine 102 is also configured to determine a plurality of values of a first tally in a first group from a first time period with respect to a second tally in the first group during a second time period.

In some embodiments, each data structure 106 also is parsed to determine a cumulative total of the transaction amounts of each payment transaction authorization request within each group/range over each of the plurality of time periods. Roughness profiling engine 102 is also configured to determine a plurality of ratio values of a first total in a first group from a first time period with respect to a second total in the first group during a second time period.

In some embodiments, each data structure 106 further is parsed to determine a count of the declined payment transaction authorization requests within each group over each of the plurality of time periods. For example, "declined" payment transaction authorization requests are those declined or rejected by an issuing bank, such as issuer 30. Roughness profiling engine 102 is also configured to determine a plurality of ratio values of a first count in a first group from a first time period with respect to a second count in the first group during a second time period.

In the example embodiment, as large numbers of payment transaction authorization requests continue to be received by roughness profiling engine 102, the common starting point of the time periods used by roughness profiling engine 102 is updated to a more recent time in order to consider the most recent payment transaction authorization requests in the cyber-attack analysis. Due to the structure of the at least one data structure 106, roughness profiling engine 102 may re-parse existing data structures 106, rendering the ratio values derived therefrom amenable to rapid storage, calculation, and updating, enabling cyber-attack detection by cyber-attack model 108 to be updated frequently, and in some embodiments in near real time.

The use of the at least one data structure 106 thus provides an advantage over at least some known cyber-attack detection systems. In some embodiments, the use of separate data structures 106 for payment transaction authorization requests 110 (e.g., and at least some of payment transaction authorization requests 110 included in payment transaction authorization requests that are passed to cyber-attack model 108) having selected shared characteristics also reveals information that is particularly helpful in detecting fraud using cyber-attack model 108, as described below. In some embodiments, roughness profiling engine 102 is configured to parse the at least one data structure 106 to obtain any suitable combination of these or other metrics derived for payment transaction authorization requests within each group/range over each of the plurality of time periods. Roughness profiling engine 102 may further be configured to determine a plurality of ratios of a first value of each metric in a first group from a first time period with respect to a second value in the first group during a second time period.

Roughness profiling engine 102 is further configured to provide feature inputs 114 for cyber-attack detection model 108 based on the determined plurality of ratio values. The set of feature inputs 114 are used to update or modify parameters of cyber-attack detection model 108 applied to profiled payment transaction authorization requests 112, facilitating the identification of potential occurrences of multiple related payment transaction fraud attempts over payment processing network 28 (shown in FIG. 3). In some embodiments, cyber-attack detection model 108 includes a plurality of machine learning algorithms 124. In various embodiments, machine learning algorithms 124 may be selectable, either automatically or by an operator, and may include at least one of an Artificial Neural Network (ANN) machine learning algorithm and a Support Vector Machine (SVM) machine learning algorithm. Cyber-attack detection model 108 may be configured to execute multiple machine learning algorithms 124 singly or simultaneously in groups.

Feature inputs 114 affect the operation of cyber-attack detection model 108 by changing parameters of cyber-attack detection model 108 that are applied to profiled payment transaction authorization requests 112. In other words, operation of cyber-attack detection model 108 changes based on the generated set of feature inputs, that is, as the generated set of feature inputs 114 changes. For example, feature inputs 114 are used to train machine learning algorithms 124. In some embodiments, feature inputs 114 generated by roughness profiling engine 102 are used to adjust node weights applied by cyber-attack detection model 108 to external inputs (e.g., profiled payment transaction authorization requests 112) to, or internal signals (e.g., intra-node signals) within the machine learning algorithm.

Additionally or alternatively, feature inputs 114 are provided as input signals into machine learning algorithms 124. Cyber-attack detection model 108 is configured to perform at least one of (e.g., in real-time or near-real-time): alerting issuers, cardholders, and/or merchants associated with a particular data structure 106 to a potential ongoing coordinated cyber-attack attempt; calculating weighted/reweighted fraud scores for the profiled payment transaction authorization requests based on at least one of the inputs 114, prior to forwarding the payment transaction authorization requests to issuer 30; generating an approve or decline recommendation for a payment transaction authorization request based on at least one of inputs 114; flagging payment transaction authorization requests 110 associated with the particular data structure 106 associated with the potential ongoing coordinated cyber-attack attempt for other special handling; generating a machine learning feedback signal 132; and applying machine learning feedback signal 132 to at least one of machine learning algorithms 124 and roughness profiling engine 102. In the example embodiment, after profiled payment transaction authorization requests 112 are processed by cyber-attack detection model 108, the corresponding payment transaction authorization requests 110 (e.g., or 112) are modified to include, for example, an accept/decline recommendation generated by cyber-attack detection model 108, and routed to issuer 30 (e.g., via payment processing network 28 shown in FIG. 3) as scored payment transaction authorization requests 119 (e.g., corresponding to the likelihood of fraudulent activity, as determined by model 108 based at least in part upon inputs from engine 102).

In some embodiments, the use of the ratio values to generate feature inputs 114 for cyber-attack detection model 108 further increases a processing speed of computing system 100. For example, the time periods that may be used to define data structures 106 are selected as progressively longer time bands extending backward in time from a common starting point, such as the current time or the time stamp of a payment transaction authorization request currently being processed, causing each of the ratio values as generated to lie between zero and one. Values ranging between zero and one are easily conditioned to serve as feature inputs 114 (e.g., node weights) for machine learning algorithms 124, thus avoiding a need for time- and resource-consuming additional processing by roughness profiling engine 102 to generate feature inputs 114. In some embodiments, feature inputs 114 are set to equal the ratio values, such that the ratio values are provided directly to cyber-attack detection model 108. In other embodiments, roughness profiling engine 102 provides limited additional conditioning of the ratio values to generate feature inputs 114, such as by squaring each of the ratio values, summing the squared ratio values, and square rooting the sum to generate corresponding feature inputs 114. For example, the further conditioning, such as by squaring, summing, and square rooting the values, facilitates increasing a stability of feature inputs 114, by reducing an effect of transient spikes in the ratio values on the value of the corresponding feature inputs 114. In alternative embodiments, feature inputs 114 are calculated from the ratio values in any suitable fashion.

In some embodiments, cyber-attack detection computing system 100 is configured to operate roughness profiling engine 102 over a first time segment using a first set of time periods and/or ranges to generate the plurality of ratio values, and in response to machine learning feedback signal 132 at the end of the first time segment, to select a second set of time periods and/or ranges to generate the plurality of ratio values going forward after the end of the first time segment. In alternative embodiments, roughness profiling engine 102 selects a different set of time periods and/or ranges in response to a signal originating from an operator of cyber-attack detection computing system 100 (e.g., based on the operator's viewing of graphical user interface 150), automatically from another component of cyber-attack detection computing system 100, or from an external system or component.

In some embodiments, cyber-attack detection computing system 100 is configured to operate cyber-attack detection model 108 using a first machine learning algorithm 124, and then in response to machine learning feedback signal 132, to automatically switch to operating cyber-attack detection model 108 using a second machine learning algorithm 124. In alternative embodiments, the signal causing cyber-attack detection model 108 to switch among machine learning algorithms 124 originates from an operator of cyber-attack detection computer system 100 (e.g., based on the operator's viewing of graphical user interface 150), automatically from another component of cyber-attack detection computing system 100, or from an external system or component.

In various embodiments, cyber-attack detection computing system 100 further includes a graphical user interface 150 configured to display information to a user in real time through a dashboard application 118. FIGS. 2A-2C illustrate graphs 200, 220, 240 displayed on graphical user interface 150 (e.g., from "birds-eye" overhead views as well as perspective views). For example, graphical user interface 150 is displayable on a display screen of a client system 414 (shown in FIG. 4). With reference to FIGS. 1A and 2A-2C, in the example embodiment, graphs 200, 220, 240 include a y-axis 202, 222, 242 graduated in units of time, an x-axis 204, 224, 244 graduated in units of USD, and a z-axis 206, 226, 246 graduated in units of function of count (e.g., function of count of transactions in a group of a data structure 106, such as roughness).

In one example, during routine surveillance of the incoming payment transaction authorization requests 112, time boundaries may be set at certain fixed intervals with respect to a current analysis time. For example, time period boundaries on the y-axis 202, 222, 242 could define six fixed intervals, which are fixed to look at time durations immediately previous to a current analysis time (e.g., the present time or a timestamp associated with a payment transaction authorization request most recently added to data structures 106), with lengths of 15 minutes, 1 hour, 6 hours, 24 hours, 1 days, and 28 days. During a suspected cyber-attack a location of time period boundaries may be modified "on-the-fly" to provide data that better enables roughness profiling engine 102 or machine learning algorithms 124, 126 to ascertain parameters of the cyber-attack.

In the example embodiment, roughness profiling engine 102 provides roughnesses of data structures 106 for display on graphs 200, 220, 240. As time advances, new transactions are added at the "bottom" of graphs 200, 220, 240 (e.g., at the intersection of the x and y axes), while older transactions scroll off of the "top." Graphs 200, 220, 240 thus provide a visual indications to a user of how the tally of payment transaction authorization requests in each group of a data structure 106 is changing over time (e.g., graph 200 may be associated with a first group, graph 220 may be associated with a second group, and graph 240 may be associated with a third group).

Moreover, in certain embodiments, the tallies and/or ratios based upon the tallies associated with payment transaction authorization requests are represented proportionally by a size and/or color (e.g., ranging from blue or "cold" 208 for smaller transaction tallies to red or "hot" 210 for higher transaction tallies). As one example, as shown in FIGS. 2A-2C, "low" roughness values are shown in a dark blue color with increasing roughnesses being shown progressing from light blue, light red, and dark red respectively as roughness "increases" to higher roughness values.

In some embodiments, graphical user interface 150 enables the user to select among one or more metrics (e.g., groups), and method of display of each metric, for display. Thus, graphical user interface 150 provided by roughness profiling engine 102 and/or dashboard application 118 enables the user to draw inferences about patterns of fraudulent activity that may be occurring with respect to the grouping/profiling of payment transaction authorization requests 112 in data structure 106, even for payment transaction authorization requests that may individually be identified as low fraud risks.

In alternative embodiments, roughness profiling engine 102 does not provide graph 122. Nevertheless, graph 122 provides a useful visual illustration of cumulative metrics, based on information in the payment transaction authorization requests in each group, calculated by roughness profiling engine 102 as discussed above. More specifically, data regarding payment transaction authorization requests 112 stored in data structures 106 is parsed over each time period for each group, and the cumulative metrics are calculated for the respective zone.

For purposes of illustration, graphs 200, 220, 240 are illustrated in FIGS. 2A-2C each representing a different group of one or more data structures 106. Roughness profiling engine 102 analyzes authorization requests and profiles authorization requests into data structure 106 based upon characteristics of the authorization requests, as described herein (e.g., by USD amount, country, merchant category, etc.). In the example embodiment, data structure 106 includes payment transaction authorization requests sorted into groups by engine 102, enabling engine 102, to operate (e.g., ratio) solely on transactions within a particular group, thereby increasing a speed of the parsing process, which advantageously enables roughness profiling engine 102 to continuously update the metrics for each group as time moves forward and the time stamps of payment transaction authorization requests in each data structure 106 are correspondingly shifted across the y-axis. Accordingly, inputs 114 to model 108 are updated in real-time and/or near-real-time to allow for better operating efficiency of model 108.

In some embodiments, roughness profiling engine 102 calculates the tally of the identified payment transaction authorization requests in a first sub-group (e.g., $5-$10 transaction amounts) of a first group. Similarly, roughness profiling engine 102 parses the portion of data structure 106 that includes payment transaction authorization requests within a group to identify payment transaction authorization requests that are time stamped between current analysis time and second time period boundary.

Roughness profiling engine 102 calculates the tally of the identified payment transaction authorization requests in a second sub-group (e.g., $10-$20 transaction amounts) of a first group. In the example embodiment, roughness profiling engine 102 further calculates the ratio values associated with group, the first sub-group, and the second sub-group as the ratio of the tally (i.e., number of transactions) in the first sub-group to the tally in the second sub-group.

Roughness profiling engine 102 may perform similar operations for each time period/decay rate for each sub-group of a group, and for each of the plurality of time periods for other groups (e.g., shown in different graphs). It should again be noted that the speed advantages provided by sorting payment transaction authorization requests 112 into data structures 106 corresponding to preselected shared characteristics of payment transaction authorization requests 112, and in some embodiments by further sorting the payment transaction authorization requests in each data structure 106 by sub-group, enables roughness profiling engine 102 to perform these operations in near real time for the extremely large number of payment transaction authorization requests 110 that are processed by payment processing network 28.

One measurement of potential fraudulent activity directly uses the ratio values based on tallies, total values, and/or decline counts of payment transaction authorization requests from the same group over a pair of time periods. For example, a ratio of the tallies from a first sub-group of a first group to a second sub-group of the first group reveals a change in payment transaction authorization requests of the same group between the two time periods of payment transaction authorization requests 112 under consideration. As another example, a ratio of the total transaction amounts from the first sub-group to the second sub-group reveals a change in the total value of the amounts for payment transaction authorization requests in the same group between the two time periods for the grouping of payment transaction authorization requests 112. As yet another example, a ratio of the decline counts from the first sub-group to the second sub-group reveals a change in declined payment transaction authorization requests of the same group between the two time periods for the grouping of payment transaction authorization requests 112.

The ratio values are useful in at least two ways. The ratio values by themselves may demonstrate trending and/or patterns that facilitate identifying a cyber-attack or confirming a suspected cyber-attack previously determined by, for example, an upstream cyber-attack detection model. The results of the trending and pattern recognition analysis may be output directly to graphical user interface 150 or transmitted to downstream analysis components or a cyber-attack management system located remotely from the cyber-attack detection computer device. Additionally or alternatively, the ratio values may provide the basis for inputs into a second or subsequent payment card fraud analysis, and are particularly well-suited to serve as inputs into machine learning algorithms, as described above with respect to cyber-attack model 108. In some embodiments, cyber-attack model 108 learns to detect underlying relationships between actual cyber-attack events and ratio values associated with various groups that may be difficult to detect by a human operator.

In some embodiments, as noted above, cyber-attack detection computer system 100 is implemented as part of, or in association with, a payment processing network 28. FIG. 3 is a schematic diagram illustrating an example multi-party payment card industry system 20 for enabling ordinary payment-by-card transactions in which merchants 24 and issuer banks 30 do not need to have a one-to-one special relationship. Embodiments described herein may relate to a payment card system, such as a credit card payment system using the Mastercard® processing network. The Mastercard® processing network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.).

In a typical payment card system, a financial institution called the "issuer" issues a payment card, such as a credit card, to a consumer or cardholder 22, who uses the payment card to tender payment for a purchase from merchant 24. To accept payment with the payment card, merchant 24 must normally establish an account with a financial institution that is part of the financial payment system. This financial institution is usually called the "merchant bank," the "acquiring bank," or the "acquirer." When cardholder 22 tenders payment for a purchase with a payment card, merchant 24 requests authorization from an acquirer or merchant bank 26 for the amount of the purchase. The request may be performed over the telephone, but is usually performed through the use of a point-of-sale terminal, which reads cardholder's 22 account information from a magnetic stripe, a chip, or embossed characters on the payment card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using payment processing network 28, computers of merchant bank 26 or merchant processor will communicate with computers of issuer bank 30 by sending a payment transaction authorization request. Based on the payment transaction authorization request, issuer 30 determines whether cardholder's 22 account 32 is in good standing and whether the purchase is covered by cardholder's 22 available credit line. Based on these determinations, the request for authorization will be declined or accepted by issuer 30. If the request is accepted, an authorization code is issued to merchant 24.

When a request for authorization is accepted, the available credit line of cardholder's 22 account 32 is decreased. Normally, a charge for a payment transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Payment processing network 28 and/or issuer bank 30 stores the payment card information, such as a type of merchant, amount of purchase, date of purchase, in a database 420 (shown in FIG. 4).

After a purchase has been made, a clearing process occurs to transfer additional transaction data related to the purchase among the parties to the transaction, such as merchant bank 26, payment processing network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and payment processing network 28, and then between payment processing network 28 and merchant bank 26, and then between merchant bank 26 and merchant 24.

In the example embodiment, payment processing network 28 routes payment transaction authorization request through cyber-attack detection computing system 100 as described above. Detection of patterns of fraudulent activity may enable payment processing network 28 to identify and prevent fraudulent transactions prior to authorization by issuer 30, thereby improving transaction processing speed and bandwidth available for legitimate transactions. Cyber-attack detection computing system 100 may be configured to provide cyber-attack data associated with payment transactions to a downstream cyber-attack management system (not shown) for further processing. Cyber-attack detection computing system 100 may be incorporated on one or more computing devices within payment processing network 28 or may be embodied in one or more separate components communicatively accessible to payment processing network 28.

Figure 4:
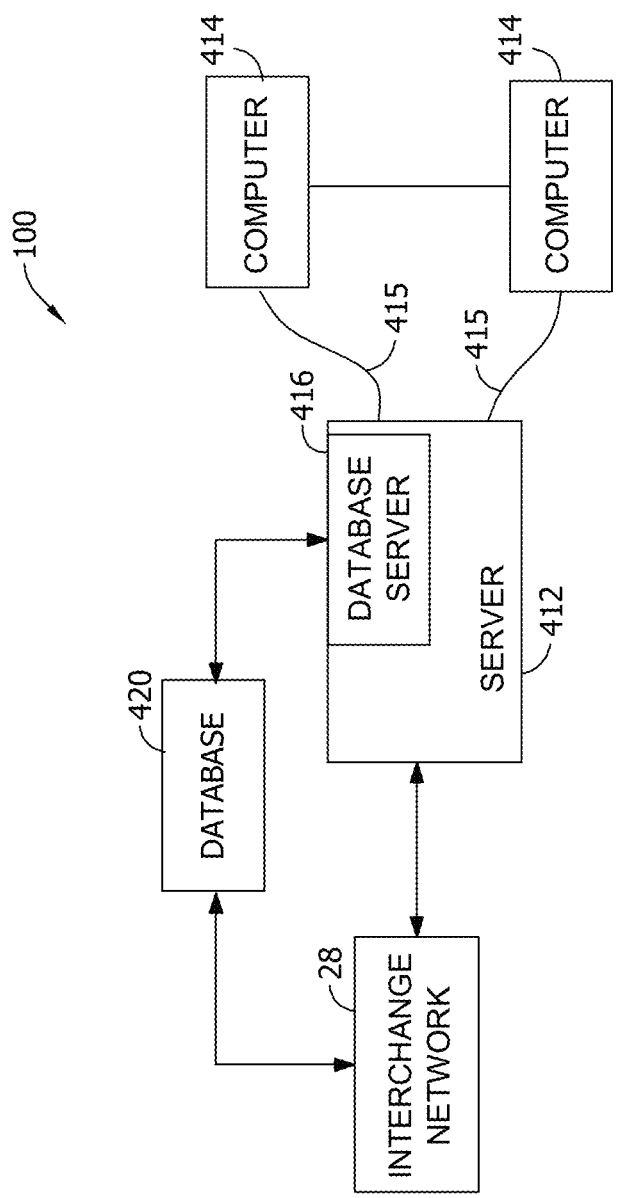

FIG. 4 is a simplified block diagram of an example cyber-attack detection computing system 100 in communication with payment processing network 28 in accordance with one embodiment of the present disclosure. In the example embodiment, cyber-attack detection computing system 100 is implemented on a server system 412. A plurality of client systems 414 is connected to server system 412. In one embodiment, client systems 414 are computers including a web browser, such that server system 412 is accessible to client systems 414 using the Internet. Client systems 414 are interconnected to the Internet through network connections 415, such as a local area network (LAN) or a wide area network (WAN), dial-in-connections, cable modems, special high-speed Integrated Services Digital Network (ISDN) lines, and RDT networks. Client systems 414 could be any device capable of connecting to the Internet including a web-based phone, PDA, or other web-based connectable equipment.

Server system 412 includes a database server 416 connected to a database 420, which contains information on a variety of matters, as described below in greater detail. In one embodiment, database 420 is centralized on, for example, server system 412 and can be accessed by potential users at one of client systems 414 by logging onto server system 412 through one of client systems 414. In an alternative embodiment, database 420 is stored remotely from server system 412 and may be non-centralized.

Database 420 may include a single database having separated sections or partitions, or may include multiple databases, each being separate from each other. Database 420 may store transaction data generated over payment processing network 28 including data relating to payment transactions, fraudulent payment transactions, and fraud scoring values and rules. Database 420 may also store account data for a plurality of cardholders, including at least one of a cardholder name, a cardholder address, an account number, other account identifiers, and transaction information. Database 420 may also store merchant data including a merchant identifier that identifies each merchant registered to use the network, and instructions for settling transactions including merchant bank account information. Database 420 may also store purchase data associated with items being purchased by a cardholder from a merchant, and authorization request data. Database 420 may also store fraud information received from cyber-attack detection computing system 100.

In the example embodiment, one of client systems 414 is a user computer device associated with a user of cyber-attack detection computing system 100. For example, the user computer device is configured to display graphical user interface 150 (shown in FIGS. 1A, 1B, and 2A-C) generated by cyber-attack detection computing system 100 via a web browser or dashboard application 118 (shown in FIG. 1A) installed on the user computer device. Web browsers enable users of client system 414 to display and interact with media and other information typically embedded on a web page or a website associated with server system 412. Dashboard application 118 allows users to interact with a server application on server system 412.

Others of client systems 414 may be associated with acquirer or merchant bank 26 and issuer 30 (shown in FIG. 3). In addition, client systems 414 may include a computer system associated with at least one of an online bank, a bill payment outsourcer, an acquirer bank, an acquirer processor, an issuer bank associated with a payment card, an issuer processor, a remote payment system, customers and/or billers. In the example embodiment, server system 412 is associated with payment processing network 28, and may be referred to as an processing computer system. Server system 412 may be used for general processing of payment transaction data as well as analyzing cyber-attack data associated with payment transactions.

Figure 5:
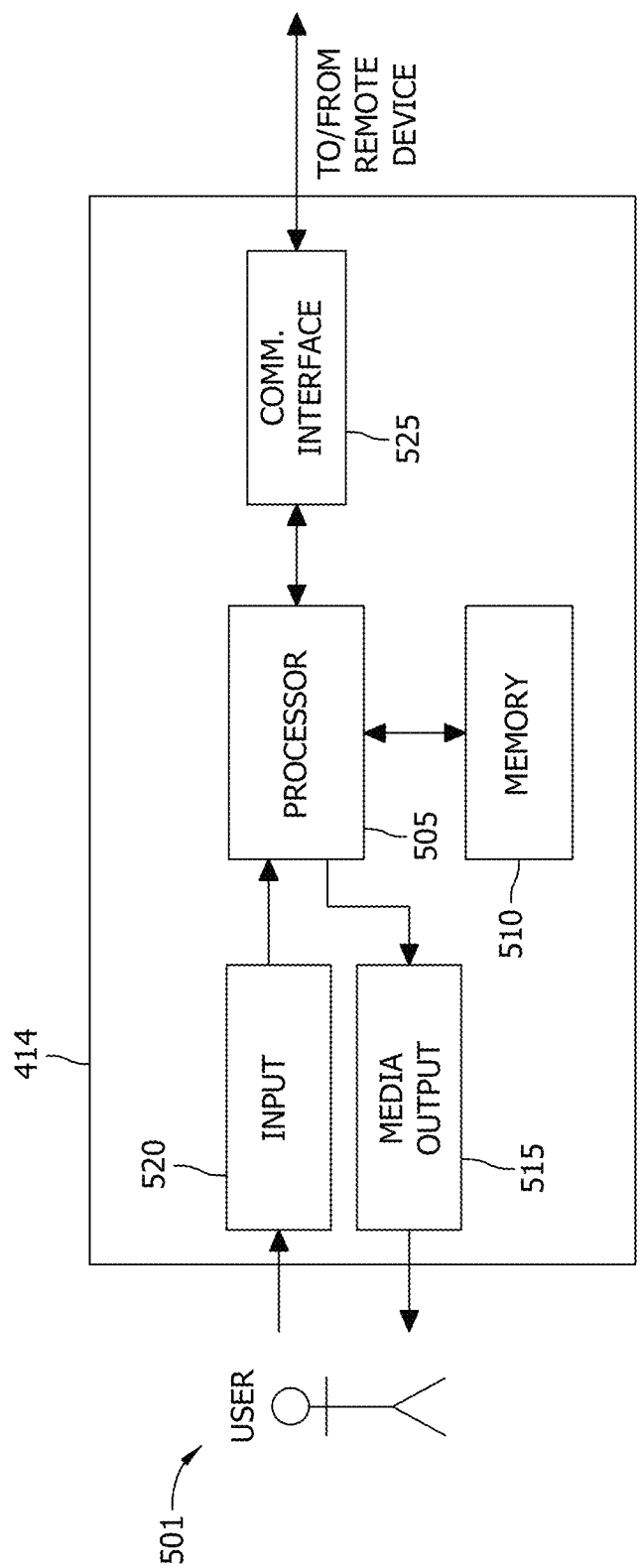

FIG. 5 illustrates an example configuration of one of client systems 414 operated by a user 501, such as an analyst. In the example embodiment, client system 414 includes a processor 505 for executing instructions. In some embodiments, executable instructions are stored in a memory area 510. Processor 505 may include one or more processing units, for example, a multi-core configuration. Memory area 510 is any device allowing information such as executable instructions and/or written works to be stored and retrieved. Memory area 510 may include one or more computer readable media.

Client system 414 also includes at least one media output component 515 for presenting information to user 501. Media output component 515 is any component capable of conveying information to user 501. For example, media output component is configured to display graphical user interface 150 (shown in FIGS. 1A, 1B, and 2A-C) to user 501. In some embodiments, media output component 515 includes an output adapter such as a video adapter and/or an audio adapter. An output adapter is operatively coupled to processor 505 and operatively coupleable to an output device such as a display device, a liquid crystal display (LCD), organic light emitting diode (OLED) display, or "electronic ink" display, or an audio output device, a speaker or headphones.

In some embodiments, client system 414 includes an input device 520 for receiving input from user 501. Input device 520 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 515 and input device 520. Client system 414 may also include a communication interface 525, which is communicatively coupleable to a remote device such as server system 412. Communication interface 525 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Figure 6:
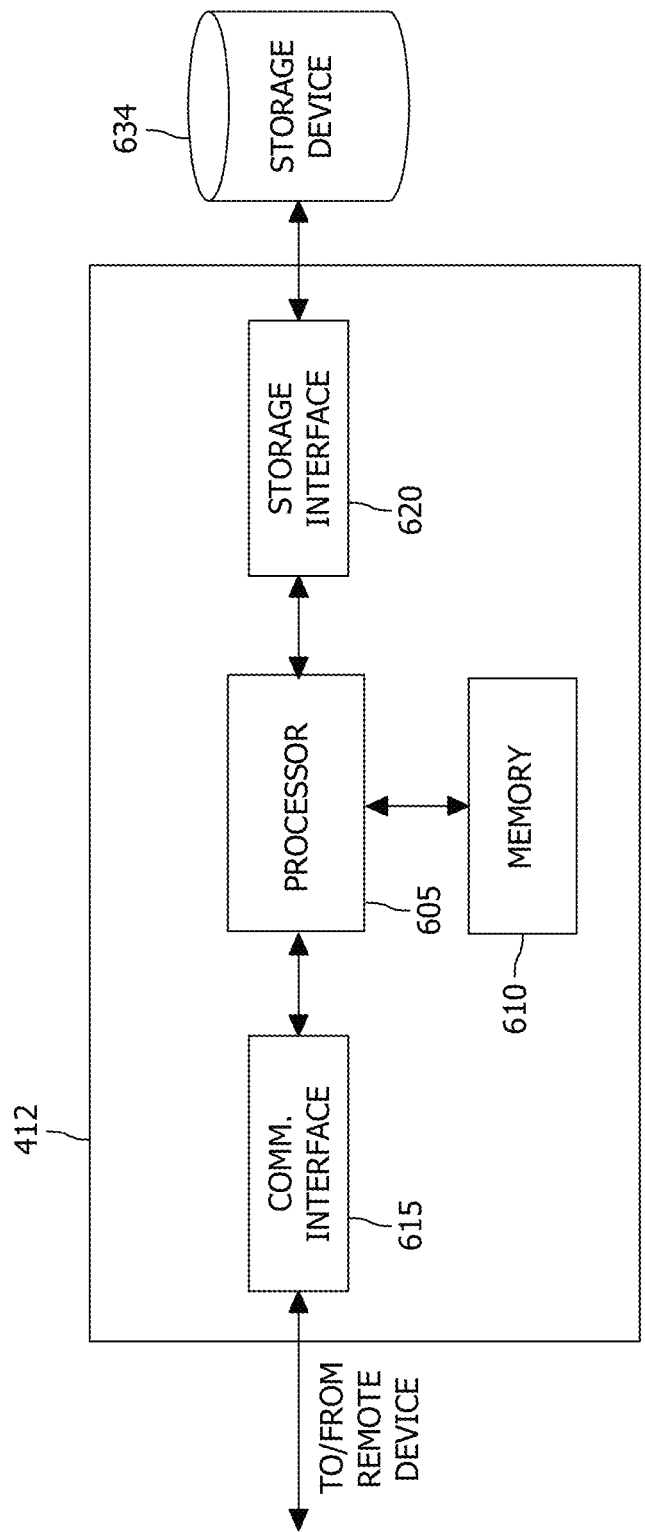

FIG. 6 illustrates an example configuration of server system 412. Server system 412 includes a processor 605 for executing instructions. Instructions may be stored in a memory area 610, for example. Processor 605 may include one or more processing units (e.g., in a multi-core configuration) for executing instructions. The instructions may be executed within a variety of different operating systems on the server system 412, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 605 is operatively coupled to a communication interface 615 such that server system 412 is capable of communicating with remote devices such as client systems 414 (shown in FIG. 4) or another server system 412. For example, communication interface 615 may receive requests from client system 414 via the Internet, as illustrated in FIG. 4.

Processor 605 may also be operatively coupled to a storage device 634, which may be used to implement database 420. Storage device 634 is any computer-operated hardware suitable for storing and/or retrieving data. In some embodiments, storage device 634 is integrated in server system 412. For example, server system 412 may include one or more hard disk drives as storage device 634. In other embodiments, storage device 634 is external to server system 412 and may be accessed by a plurality of server systems 412. For example, storage device 634 may include multiple storage units such as hard disks or solid-state disks in a redundant array of inexpensive disks (RAID) configuration. Storage device 634 may include a storage area network (SAN) and/or a network attached storage (NAS) system.

In some embodiments, processor 605 is operatively coupled to storage device 634 via a storage interface 620. Storage interface 620 is any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Memory area 610 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In operation, cyber-attack detection computing system 100 (shown in FIG. 1A) runs on server system 412. In some embodiments, at least one of roughness profiling engine 102 and cyber-attack model 108 runs on the same server system 412. Alternatively, each of roughness profiling engine 102 and cyber-attack model 108 runs on separate server systems 412 communicatively coupled to each other. User 501 (shown in FIG. 5) interacts with server system 412, and processes such as roughness profiling engine 102, using one of client systems 414 (shown in FIG. 4).

Figure 7:
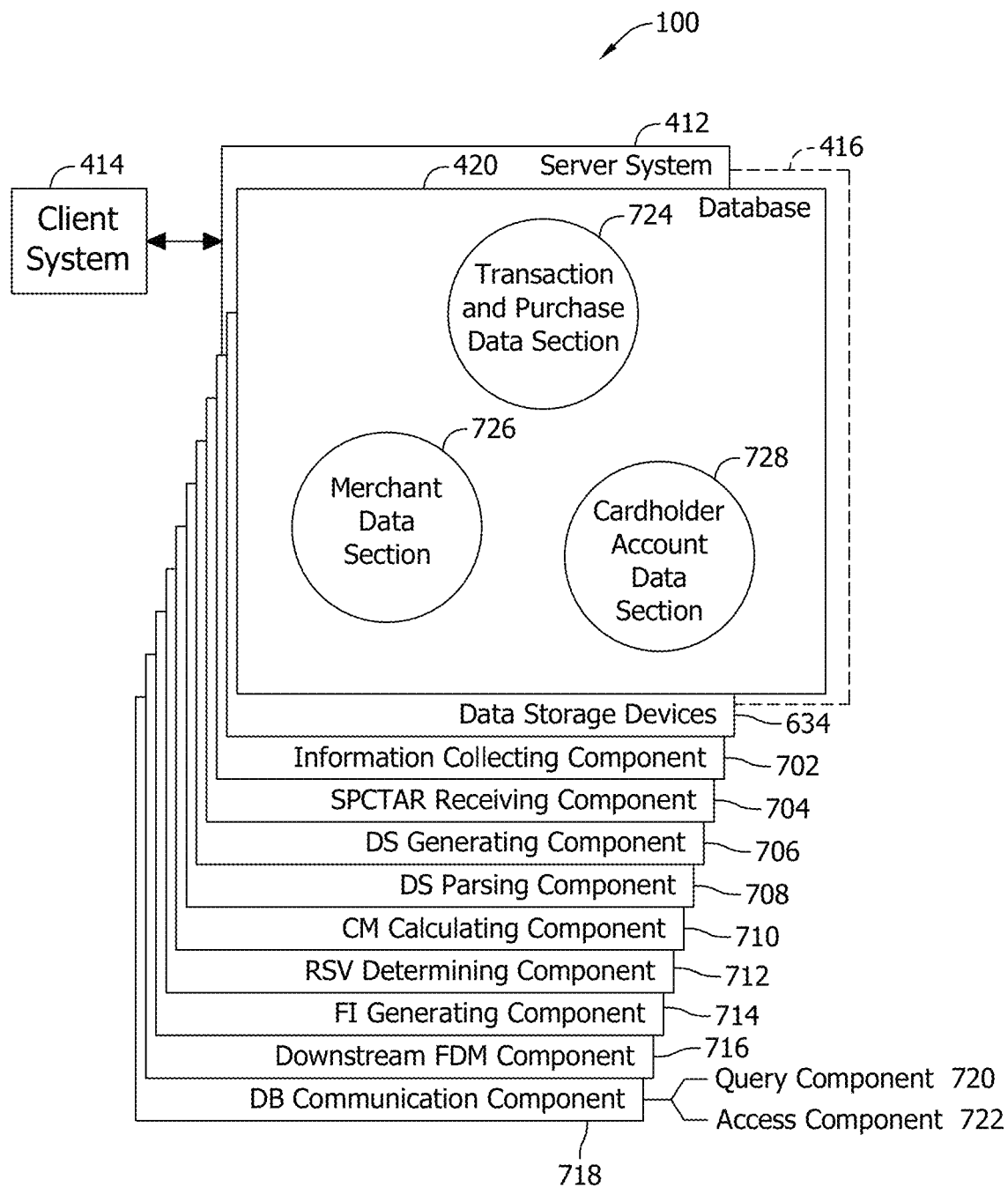

FIG. 7 shows an example configuration of cyber-attack detection computing system 100. Database 420 is coupled to several separate components within cyber-attack detection computing system 100, which perform specific tasks. In the example embodiment, server system 412, database server 416, and database 420 are all contained in a single computing device. In other embodiments, cyber-attack management server system 412, database server 416, and database 420 may be contained in separate computing devices which are communicatively coupled to each other.

Cyber-attack detection computing system 100 in the example embodiment includes an information collecting component 702 for collecting information from users into database 420, a payment transaction authorization request receiving component 704 for receiving payment transaction authorization requests 112 from roughness profiling engine 102 and originating from a plurality of merchants 24, a data structure generating component 706 to generate at least one data structure 106 having payment transaction authorization requests, a data structure parsing component 708 to parse the at least one data structure over a plurality of time periods, and a cumulative metric calculating component 710 to calculate cumulative metrics for various ones of the time periods based on the parsed at least one data structure. Cyber-attack detection computing system 100 further includes a ratio value determining component 712 for determining ratio values from the cumulative metrics as described above. A feature input generating component 714 generates sets of feature inputs 114 using the determined ratio values. A downstream cyber-attack detection model component 716 receives the sets of feature inputs 114 and applies a cyber-attack detection model to payment transaction authorization requests 112, wherein parameters of the cyber-attack detection model are configured to change based on the received feature inputs 114, as discussed above.

Cyber-attack detection computing system 100 also includes a database communication component 718 that includes a query component 720 programmed to receive a specific query from client system 414, and an access component 722 to access database 420. Query component 720 is programmed for receiving a specific query, a data request and/or a data message (collectively referred to as a "query") from one of a plurality of users. Database communication component 718 searches and processes received queries against storage device 634 containing a variety of information collected by collection component 702. In an exemplary embodiment, database 420 is divided into a plurality of sections, including but not limited to, a Transaction and Purchase Data Section 724, a Merchant Data Section 726, and a Cardholder Account Data Section 728. These sections within database 420 are interconnected to update and retrieve the information as required.

Figure 8:
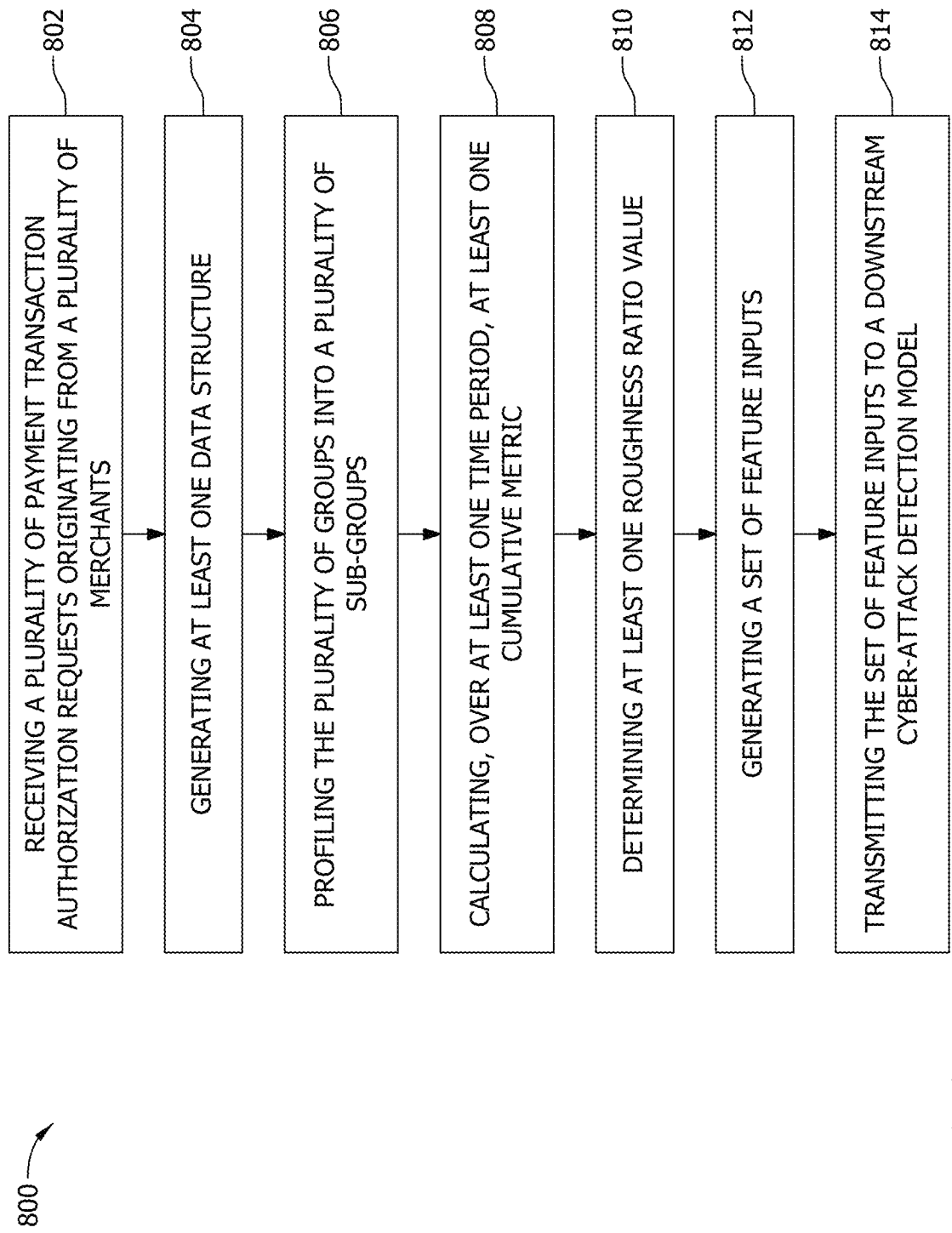

FIG. 8 is a flow diagram of a computer-implemented method 800 for detecting fraudulent network transactions in a payment transaction network. In the example embodiment, method 800 includes receiving 802 a plurality of payment transaction authorization requests (e.g., requests 110) originating from a plurality of merchants (e.g., merchants 24) and generating 804 at least one data structure (e.g., structure 106) wherein the at least one data structure sorts the payment transaction authorization requests over a plurality of groups, each group of the plurality of groups associated with a first data field of the plurality of payment transaction authorization requests (e.g., at least one of a merchant identifier (ID), an issuer ID, or an acquirer ID). Method 800 also includes profiling 806 the plurality of groups into a plurality of sub-groups, each sub-group of the plurality of sub-groups including payment transaction authorization requests of a respective group and associated with a second data field of the plurality of payment transaction authorization requests (a dollar amount) and calculating 808, over at least one time period, at least one respective cumulative metric (e.g., velocity) from the payment transaction authorization requests associated with at least one of the plurality of sub-groups.

The example embodiment of method 800 also includes determining 810 at least one roughness ratio value including a ratio of a first value of the at least one respective cumulative metric for a first sub-group of the plurality of sub-groups with a first decay rate with respect to a second value of the at least one respective cumulative metric for the first sub-group of the plurality of sub-groups with a second decay rate, generating 812 a set of feature inputs based on the at least one roughness ratio value, and 814 transmitting the set of feature inputs (e.g., including requests 112 and/or feature inputs 114) to the downstream cyber-attack detection model (e.g., model 108) wherein the downstream cyber-attack detection model, in response to receipt of the set of features inputs, is configured to apply a machine learning model to the payment transaction authorization requests.

In some embodiments, method 800 includes receiving a new payment transaction authorization request, profiling the new payment transaction authorization request into a group of the plurality of groups and a sub-group of the group, and updating the at least one respective cumulative metric associated with the sub-group. In some embodiments, method 800 includes determining a new roughness ratio value based on the updated at least one respective cumulative metric, generating a new set of feature inputs based on the new roughness ratio value, and transmitting the new set of feature inputs to the downstream cyber-attack detection model. Further, method 800 may include receiving a model output from the downstream cyber-attack detection model identifying a potential cyber-attack and at least one of i) transmitting a notification regarding the potential cyber-attack to a computing device associated with the first data field wherein the first data field comprises at least one of a merchant identifier (ID), an issuer ID, or an acquirer ID or ii) automatically denying the new payment transaction authorization request based on the model output.

As used herein, "machine learning" refers to statistical techniques to give computer systems the ability to "learn"

(e.g., progressively improve performance on a specific task) with data, without being explicitly programmed for that specific task.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the term "mobile computing device" refers to any computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computing system for detecting cyber-attack events in a computer network, the computing system comprising:
at least one memory with instructions stored thereon and;
at least one processor in communication with the at least one memory, wherein the instructions, when executed by the at least one processor, cause the at least one processor to execute a roughness profiling engine and a cyber-attack detection model, wherein the roughness profiling engine is configured to:
receive a plurality of payment transaction authorization request messages originating from a plurality of merchants;
generate at least one data structure, wherein the at least one data structure sorts the payment transaction authorization request messages over a plurality of groups, each group of the plurality of groups associated with a first data field of the plurality of payment transaction authorization request messages;
profile the plurality of groups into a plurality of sub-groups, each sub-group of the plurality of sub-groups comprising payment transaction authorization request messages of a respective group and associated with a second data field of the plurality of payment transaction authorization request messages;
calculate, over at least one time period, at least one respective cumulative metric from the payment transaction authorization request messages associated with at least one of the plurality of sub-groups;
determine at least one roughness ratio value comprising a ratio of a first value of the at least one respective cumulative metric for a first sub-group of the plurality of sub-groups with a first decay rate with respect to a second value of the at least one respective cumulative metric for the first sub-group of the plurality of sub-groups with a second decay rate;

generate a set of feature inputs based on the at least one roughness ratio value;

transmit the set of feature inputs to the cyber-attack detection model, wherein the cyber-attack detection model, in response to receipt of the set of features inputs, is configured to apply a machine learning model to the payment transaction authorization request messages;

receive a model output from the cyber-attack detection model identifying a potential cyber-attack; and transmit a notification regarding the potential cyber-attack to a computing device associated with the first data field, wherein the first data field comprises at least one of a merchant identifier (ID), an issuer ID, or an acquirer ID.

2. The computing system of claim 1, wherein each sub-group of the plurality of sub-groups is associated with a dollar range, and wherein the second data field comprises a dollar amount.

3. The computing system of claim 1, wherein the at least one cumulative metric comprises a velocity comprising a rate at which transactions occur.

4. The computing system of claim 1, wherein the roughness profiling engine is further configured to:

receive a new payment transaction authorization request;

profile the new payment transaction authorization request into a group of the plurality of groups and a sub-group of the group;

update the at least one respective cumulative metric associated with the sub-group;

determine a new roughness ratio value based on the updated at least one respective cumulative metric;

generate a new set of feature inputs based on the new roughness ratio value; and transmit the new set of feature inputs to the cyber-attack detection model.

5. The computing system of claim 4, wherein the instructions further cause the at least one processor to:

receive a second model output from the cyber-attack detection model identifying a second potential cyber-attack; and transmit a second notification regarding the potential cyber-attack to the computing device associated with the first data field.

6. The computing system of claim 4, wherein the instructions further cause the at least one processor to:

receive a second model output from the cyber-attack detection model identifying a second potential cyber-attack; and automatically deny the new payment transaction authorization request based on the second model output.

7. The computing system of claim 4, wherein the instructions further cause the at least one processor to:

receive a second model output from the cyber-attack detection model identifying a second potential cyber-attack; and automatically deploy additional computer resources to authenticate future transaction requests associated with the group to further reduce a likelihood of transactions associated with a cyber-attack being authenticated.

8. At least one non-transitory computer-readable storage medium with instructions stored thereon that, in response to execution by at least one processor implementing a roughness profiling engine and a cyber-attack detection model, cause the at least one processor to:

receive a plurality of payment transaction authorization request messages originating from a plurality of merchants;

generate at least one data structure, wherein the at least one data structure sorts the payment transaction authorization request messages over a plurality of groups, each group of the plurality of groups associated with a first data field of the plurality of payment transaction authorization request messages;

profile the plurality of groups into a plurality of sub-groups, each sub-group of the plurality of sub-groups comprising payment transaction authorization request messages of a respective group and associated with a second data field of the plurality of payment transaction authorization request messages;

calculate, over at least one time period, at least one respective cumulative metric from the payment transaction authorization request messages associated with at least one of the plurality of sub-groups;

determine at least one roughness ratio value comprising a ratio of a first value of the at least one respective cumulative metric for a first sub-group of the plurality of sub-groups with a first decay rate with respect to a second value of the at least one respective cumulative metric for the first sub-group of the plurality of sub-groups with a second decay rate;

generate a set of feature inputs based on the at least one roughness ratio value;

transmit the set of feature inputs to the cyber-attack detection model, wherein the cyber-attack detection model, in response to receipt of the set of features inputs, is configured to apply a machine learning model to the payment transaction authorization request messages;

receive a model output from the cyber-attack detection model identifying a potential cyber-attack; and transmit a notification regarding the potential cyber-attack to a computing device associated with the first data field, wherein the first data field comprises at least one of a merchant identifier (ID), an issuer ID, or an acquirer ID.

9. The at least one non-transitory computer-readable storage medium of claim 8, wherein each sub-group of the plurality of sub-groups is associated with a dollar range, and wherein the second data field comprises a dollar amount.

10. The at least one non-transitory computer-readable storage medium of claim 8, wherein the at least one cumulative metric comprises a velocity comprising a rate at which transactions occur.

11. The at least one non-transitory computer-readable storage medium of claim 8, wherein the roughness profiling engine is further configured to:

receive a new payment transaction authorization request;

profile the new payment transaction authorization request into a group of the plurality of groups and a sub-group of the group;

update the at least one respective cumulative metric associated with the sub-group;

determine a new roughness ratio value based on the updated at least one respective cumulative metric;

generate a new set of feature inputs based on the new roughness ratio value; and transmit the new set of feature inputs to the cyber-attack detection model.

12. The at least one non-transitory computer-readable storage medium of claim 11, wherein the instructions further cause the at least one processor to:
receive a second model output from the cyber-attack detection model identifying a second potential cyber-attack; and
transmit a second notification regarding the potential cyber-attack to the computing device associated with the first data field.

13. The at least one non-transitory computer-readable storage medium of claim 11, wherein the instructions further cause the at least one processor to:
receive a second model output from the cyber-attack detection model identifying a second potential cyber-attack; and
automatically deny the new payment transaction authorization request based on the model output.

14. The at least one non-transitory computer-readable storage medium of claim 8, wherein the set of feature inputs comprises the at least one cumulative metric and the at least one roughness ratio value.

15. A method for detecting cyber-attack events in a computer network implemented by at least one memory and at least one processor executing a roughness profiling engine and a cyber-attack detection model, the method comprising:
receiving a plurality of payment transaction authorization request messages originating from a plurality of merchants;
generating at least one data structure, wherein the at least one data structure sorts the payment transaction authorization request messages over a plurality of groups, each group of the plurality of groups associated with a first data field of the plurality of payment transaction authorization request messages;
profiling the plurality of groups into a plurality of sub-groups, each sub-group of the plurality of sub-groups comprising payment transaction authorization request messages of a respective group and associated with a second data field of the plurality of payment transaction authorization request messages;
calculating, over at least one time period, at least one respective cumulative metric from the payment transaction authorization request messages associated with at least one of the plurality of sub-groups;
determining at least one roughness ratio value comprising a ratio of a first value of the at least one respective cumulative metric for a first sub-group of the plurality of sub-groups with a first decay rate with respect to a second value of the at least one respective cumulative metric for the first sub-group of the plurality of sub-groups with a second decay rate;
generating a set of feature inputs based on the at least one roughness ratio value;
transmitting the set of feature inputs to the cyber-attack detection model, wherein the cyber-attack detection model, in response to receipt of the set of features inputs, is configured to apply a machine learning model to the payment transaction authorization request messages;
receiving a model output from the cyber-attack detection model identifying a potential cyber-attack; and
transmitting a notification regarding the potential cyber-attack to a computing device associated with the first data field, wherein the first data field comprises at least one of a merchant identifier (ID), an issuer ID, or an acquirer ID.

16. The method of claim 15, further comprising:
receiving a new payment transaction authorization request;
profiling the new payment transaction authorization request into a group of the plurality of groups and a sub-group of the group;
updating the at least one respective cumulative metric associated with the sub-group;
determining a new roughness ratio value based on the updated at least one respective cumulative metric;
generating a new set of feature inputs based on the new roughness ratio value;
transmitting the new set of feature inputs to the cyber-attack detection model;
receiving a second model output from the cyber-attack detection model identifying a second potential cyber-attack; and
at least one of i) transmitting a second notification regarding the potential cyber-attack to the computing device associated with the first data field or ii) automatically denying the new payment transaction authorization request based on the model output.

* * * * *